(12) United States Patent
Matsumura et al.

(10) Patent No.: US 7,379,479 B2
(45) Date of Patent: May 27, 2008

(54) COMMUNICATION APPARATUS, COMMUNICATION METHOD AND PROGRAM

(75) Inventors: Yoichi Matsumura, Kanagawa (JP); Katsumi Tahara, Tokyo (JP); Hiroaki Seto, Kanagawa (JP); Eisaburo Itakura, Kanagawa (JP); Hiroshi Meguro, Kanagawa (JP)

(73) Assignee: Sony Corporation, Tokyo (JP)

( * ) Notice: Subject to any disclaimer, the term of this patent is extended or adjusted under 35 U.S.C. 154(b) by 991 days.

(21) Appl. No.: 10/254,257

(22) Filed: Sep. 25, 2002

(65) Prior Publication Data

US 2003/0189953 A1  Oct. 9, 2003

(30) Foreign Application Priority Data

Sep. 27, 2001 (JP) ............................ P2001-297291
Sep. 20, 2002 (JP) ............................ P2002-275901

(51) Int. Cl.
*H04J 3/06* (2006.01)

(52) U.S. Cl. ..................................................... 370/503

(58) Field of Classification Search ...................... None
See application file for complete search history.

(56) References Cited

U.S. PATENT DOCUMENTS 5,640,388 A * 6/1997 Woodhead et al. ......... 370/468
5,790,543 A * 8/1998 Cloutier ...................... 370/252
5,828,414 A * 10/1998 Perkins et al. ......... 375/240.01
6,002,687 A * 12/1999 Magee et al. ............... 370/394
6,347,119 B2 * 2/2002 Matsumura et al. ... 375/240.28
6,557,031 B1 * 4/2003 Mimura et al. ............. 709/218

OTHER PUBLICATIONS

Tryfonas, A Restamping Approach to Clock Recovery in MPEG-2 Systems Layer, UCSC, pp. 1-27, May 1998.*

* cited by examiner

*Primary Examiner*—Frank Duong
(74) *Attorney, Agent, or Firm*—ReedSmith LLP; Doyle B. Johnson

(57) ABSTRACT

The present invention is an apparatus and method to remove delay fluctuations generated on a plurality of networks.

A reception apparatus 22 receives ATM cells transmitted through a network 4-1 and a network 4-2, converting the cells into a transport stream. At that time, the reception apparatus 22 expresses a PCR packet's timing of arrival at the reception apparatus 22 by a count value obtained as a result of counting the number of clock pulses (clock pulses Nr) synchronous with a network clock signal of the network 4-2. The reception apparatus 22 also computes a new PCR value W on the basis of the count value and the phase-difference information used as synchronization information. The reception apparatus 22 then computes a new PCR value X on the basis of an original PCR value E recorded from the beginning on the encoding side and the PCR value W, newly recording the PCR value X.

14 Claims, 21 Drawing Sheets

```
      1-1:  ENCODER 1-2:  ENCODER 1-3:  ENCODER 5  1-4:  ENCODER

2:    MULTIPLEXER (SYSTEM CLOCK Se)

21:   TRANSMISSION APPARATUS (CLOCK Ns)

4-1:  NETWORK 4-2:  NETWORK 10  22:   RECEPTION APPARATUS (CLOCK Nr)

6:    SET TOP BOX (SYSTEM CLOCK Sd)

7:    MONITOR
```

FIG. 3
Prior Art
| PID VALUE | DESCRIPTION |
|---|---|
| 0x0000 | PAT HAS BEEN STORED |
| 0x0001 | CAT HAS BEEN STORED |
| 0x0002~0x000F | RESERVED |
| 0x0010~0x1FFE | PROGRAM HAS BEEN STORED |
| 0x1FFF | NULL |
FIG. 4A
Prior Art
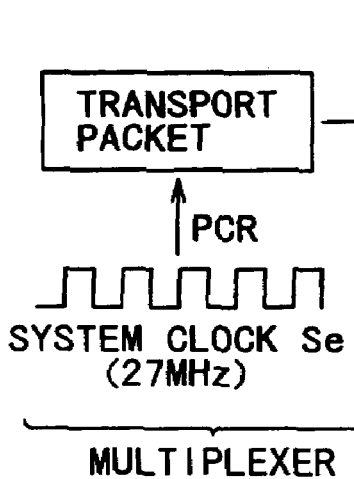
MULTIPLEXER
FIG. 4B
Prior Art
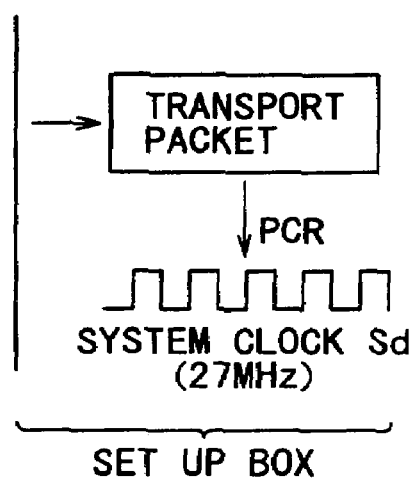
SET UP BOX

FIG. 8

1-1: ENCODER 1-2: ENCODER 1-3: ENCODER 1-4: ENCODER

2: MULTIPLEXER (SYSTEM CLOCK Se)

21: TRANSMISSION APPARATUS (CLOCK Ns)

4-1: NETWORK 4-2: NETWORK

22: RECEPTION APPARATUS (CLOCK Nr)

6: SET TOP BOX (SYSTEM CLOCK Sd)

7: MONITOR

FIG. 9

31: SYNC UNIT

32: PCR-PACKET DETECTION UNIT

33A: COUNTER

33B: COUNTER

33: SYNCHRONIZATION-INFORMATION-PROCESSING UNIT

34: MEMORY

35: MPEG/ATM CONVERSION UNIT

FIG. 10

52: PHASE COMPARISON UNIT

53: DIVIDER 1/3,375

FIG. 11

START SYNCHRONIZATION ESTABLISHMENT PROCESSING OF TRANSPORT STREAM

S1: 47H READ OUT?

S3: READ OUT DATA SEPARATED AWAY BY 188 BYTES

S7: ESTABLISH SYNCHRONIZATION OF MPEG TRANSPORT STREAM

S9: READ OUT DATA SEPARATED AWAY BY 188 BYTES

FIG. 12

HUNTING STATE

≠ 47H (Y TIMES)

≠ 47H (NOT MORE THAN (Y-1) TIMES)

= 47H (NOT MORE THAN (X-1) TIMES)

ESTABLISHED-SYNCHRONIZATION STATE

= 47H (X TIMES)

PRE-SYNCHRONIZATION STATE

FIG. 13

START SYNCHRONIZATION-INFORMATION GENERATION PROCESSING

S21: DETECT FIRST PCR PACKET

S22: COMPUTE CLOCK NS REFERENCE VALUE AND OFFSET VALUE

S23: STORE CLOCK NS REFERENCE VALUE AND OFFSET VALUE

S24: PCR PACKET DETECTED?

S25: COUNT VALUE ≦ 3,240,000?

S26: WRITE -128

S27: COMPUTE SYNCHRONIZATION INFORMATION

S28: WRITE SYNCHRONIZATION INFORMATION

S29: SUBTRACT 39H FROM SYNCHRONIZATION INFORMATION

S30: UPDATE CLOCK Ns REFERENCE VALUE AND OFFSET VALUE

FIG. 14

PCR PACKET K1 (PCR VALUE $E_1$)    PCR PACKET K2 (PCR VALUE $E_2$)    PCR PACKET K3 (PCR VALUE $E_3$)

CLOCK Ns    CLOCK Ns REFERENCE VALUE    OFFSET VALUE

SYSTEM CLOCK Se    PCR VALUE $E_1$ (CLOCK Se REFERENCE VALUE)

PCR VALUE $E_3$

CLOCK Ns

FIG. 15

SYNCHRONIZATION INFORMATION    SIGNIFICATION

SUBTRACTED SYNCHRONIZATION INFORMATION

MEANS THAT NO PHASE-DIFFERENCE INFORMATION IS INCLUDED

GENERATION OF ERROR

RESERVED

-125 TO 125    PHASE-DIFFERENCE INFORMATION (-250 TO 250) 44Ah TO 44h

RESERVED

RESERVED

FIG. 16

72: PLL CIRCUIT (PHASE COMPARATOR)

77: MEMORY

71: ATM/MPEG CONVERSION UNIT

73: ADAPTIVE CLOCK UNIT

74: SYNC UNIT

75: PCR-PACKET DETECTION UNIT

76A: COUNTER

76B: COUNTER

76: PCR RENEWAL UNIT

78: PCR-PACKET DETECTION UNIT

79: PCR RENEWAL UNIT

79A: COUNTER

80: MEMORY

81: PCR COMPARISON UNIT

83: VCXO (27 MHz COUNTER)

FIG. 17

92: CONTROL UNIT

FIG. 18

| COMPARISON RESULT | COMPARISON VALUE |
|---|---|
| PCR VALUE E > PCR VALUE X | |
| PCR VALUE E = PCR VALUE X | |
| PCR VALUE E < PCR VALUE X | 5 |

FIG. 19

START PCR-RENEWAL PROCESSING

S41: DETERMINE OFFSET VALUE

S42: DETECT FIRST PCR PACKET

S43: DETERMINE CLOCK Nr REFERENCE VALUE

S44: STORE OFFSET VALUE AND CLOCK Nr REFERENCE VALUE

S45: COUNT VALUE ≦ 3,240,000?

S46: COMPUTE PCR VALUE W

S47: RENEW PCR VALUE

S48: UPDATE OFFSET VALUE AND CLOCK Nr REFERENCE VALUE

FIG. 20

START

S61: DETECT REFERENCE PCR PACKET

S63: ACQUIRE TENTATIVE CLOCK Nr REFERENCE VALUE, TENTATIVE CLOCK Se REFERENCE VALUE AND TENTATIVE OFFSET VALUE

S64: PCR packet detected?

S65: COMPUTE ΔE ON THE BASIS OF COUNT VALUE AND PCR VALUE

S67: STOREΔE

S70: COMPUTE AVERAGE OF ΔE VALUES

S71: OFFSET VALUE = TENTATIVE OFFSET VALUE +ΔE AVERAGE

RETURN

FIG. 21

PCR VALUE

REFERENCE PCR PACKET

Time

FIG. 22

OFFSET VALUE

ΔE AVERAGE

TENTATIVE OFFSET VALUE

TIME

FIG. 23

PCR PACKET K11 (PCR VALUE $E_{11}$)   PCR PACKET K12 (PCR VALUE $E_{12}$)   PCR PACKET K13 (PCR VALUE $E_{13}$)

CLOCK Nr   CLOCK Nr REFERENCE VALUE

SYSTEM CLOCK Se   PCR VALUE $E_{11}$ (CLOCK Se REFERENCE VALUE)   OFFSET   CORRECTION VALUE   PCR VALUE W

PCR VALUE $E_3$

CLOCK Nr

FIG. 24

START PCR-RENEWAL PROCESSING

S81: COMPUTE GRADIENT L

S82: COMPUTE OFFSET VALUE

S83: COMPUTE CORRECTION VALUE

S84: COMPUTE PCR VALUE X

S85: RENEW PCR

S86: UPDATE GRADIENT L

S87: UPDATE OFFSET VALUE

GRADIENT L

72: PLL CIRCUIT (PHASE COMPARATOR)

77: MEMORY

71: ATM/MPEG CONVERSION UNIT

73: ADAPTIVE CLOCK UNIT

74: SYNC UNIT

75: PCR-PACKET DETECTION UNIT

76A: COUNTER

76B: COUNTER

76: PCR RENEWAL UNIT

78: PCR-PACKET DETECTION UNIT

79: PCR RENEWAL UNIT

79A: COUNTER

80: MEMORY

81: PCR COMPARISON UNIT

83: VCXO (27 MHz COUNTER)

FIG. 30

COMPARISON RESULT    COMPARISON VALUE

PCR VALUE E > PCR VALUE W

PCR VALUE E = PCR VALUE W

PCR VALUE E < PCR VALUE W

FIG. 31

START PCR-RENEWAL PROCESSING

S91: COMPUTE GRADIENT L

S92: COMPUTE OFFSET VALUE

S93: COMPUTE CORRECTION VALUE

S94: COMPUTE PCR VALUE X

S95: RENEW PCR

S96: UPDATE GRADIENT L

S97: UPDATE OFFSET VALUE

FIG. 32

72: PLL CIRCUIT (PHASE COMPARATOR)

77: MEMORY

71: ATM/MPEG CONVERSION UNIT

73: ADAPTIVE CLOCK UNIT

74: SYNC UNIT

75: PCR-PACKET DETECTION UNIT

76A: COUNTER

76B: COUNTER

76: PCR RENEWAL UNIT

78: PCR-PACKET DETECTION UNIT

101: PCR RENEWAL UNIT

101A: COUNTER

102: MEMORY

103: PCR COMPARISON UNIT

83: VCXO (27 MHz COUNTER)

FIG. 33

COMPARISON RESULT        COMPARISON VALUE

PCR VALUE W > PCR VALUE Y

PCR VALUE W = PCR VALUE Y

PCR VALUE W < PCR VALUE Y

FIG. 34

START PCR-RENEWAL PROCESSING

S101:   COMPUTE GRADIENT L

S102:   COMPUTE OFFSET VALUE

S103:   COMPUTE CORRECTION VALUE

S104:   COMPUTE PCR VALUE Y

S105:   RENEW PCR

S106:   UPDATE GRADIENT L

S107:   UPDATE OFFSET VALUE

72:   PLL CIRCUIT (PHASE COMPARATOR)

77:   MEMORY

71:   ATM/MPEG CONVERSION UNIT

73:   ADAPTIVE CLOCK UNIT

74:   SYNC UNIT

75: PCR-PACKET DETECTION UNIT

76A: COUNTER

76B: COUNTER

76: PCR RENEWAL UNIT

78: PCR-PACKET DETECTION UNIT

79: PCR RENEWAL UNIT

79A: COUNTER

80: MEMORY

81: PCR COMPARISON UNIT

83: VCXO (27 MHz COUNTER)

FIG. 37

COMPARISON RESULT  COMPARISON VALUE

PCR VALUE X - PCR VALUE Y ≦ -1

-1 < PCR VALUE X - PCR VALUE Y < 1

PCR VALUE X - PCR VALUE Y ≧ 1

FIG. 38

1-1: ENCODER 1-2: ENCODER 1-3: ENCODER 1-4: ENCODER

201: MULTIPLEXER (SYSTEM CLOCK Se)

3: TRANSMISSION APPARATUS (CLOCK Ns)

4: NETWORK

5: RECEPTION APPARATUS (CLOCK Nr)

6: SET TOP BOX (SYSTEM CLOCK Sd)

7: MONITOR

FIG. 39

211-1: TIME-STAMP ADDITION UNIT 211-2: TIME-STAMP ADDITION UNIT 211-3: TIME-STAMP ADDITION UNIT 211-4: TIME-STAMP ADDITION UNIT

217: VCXO(27-MHz COUNTER)

214: PCR COLLECTION

216: MEMORY

215: PCR RENEWAL UNIT

FIG. 40

TIME STAMP

TRANSPORT PACKET

FIG. 41

START PCR-RENEWAL PROCESSING

S111: COMPUTE GRADIENT SL

S112: COMPUTE OFFSET VALUE

S113: |PCR VALUE V - PCR VALUE Z| > L?

S114: COMPUTE CORRECTION VALUE

S115: COMPUTE PCR VALUE Z

S116: RENEW PCR

S117: UPDATE GRADIENT S

S118: UPDATE OFFSET VALUE

GRADIENT L

FIG. 44

COMPARISON RESULT    COMPARISON VALUE

PCR VALUE Z > PCR VALUE V

PCR VALUE Z = PCR VALUE V

PCR VALUE Z < PCR VALUE V

FIG. 45

211-1: TIME-STAMP ADDITION UNIT 211-2: TIME-STAMP ADDITION UNIT 211-3: TIME-STAMP ADDITION UNIT 211-4: TIME-STAMP ADDITION UNIT

217: VCXO(27-MHz COUNTER)

214: PCR COLLECTION

216: MEMORY

215: PCR RENEWAL UNIT

221: DETECTION UNIT

221A: COUNTER

221B: COUNTER

222: MEMORY

FIG. 46

START DISCONTINUITY DETECTION PROCESSING

S131: DETECT FIRST PCR PACKET

S132: COMPUTE REFERENCE VALUE A AND OFFSET VALUE

S133: STORE REFERENCE VALUE A AND OFFSET VALUE

S134: PCR PACKET DETECTED?

S135: COUNT VALUE $\leqq$ 3,240,000?

S136: COMPUTE DISCONTINUITY

S137: |DISCONTINUITY VALUE| > Lp?

S138: NOTIFY

FIG. 47

PCR PACKET $K_n$ (PCR VALUE $V_n$)    PCR PACKET $K_{n+1}$ (PCR VALUE $V_{n+1}$)    PCR PACKET $K_{n+2}$ (PCR VALUE $V_{n+2}$)

COUNT VALUE OF COUNTER 221A    REFERENCE VALUE A

OFFSET VALUE

PCR VALUE $V_n$ (REFERENCE VALUE B)    PCR VALUE $V_{n+2}$

Count value of counter 221B

FIG. 48

514: HARD DISC
515: BUS
516: INPUT/OUTPUT INTERFACE
517: OUTPUT UNIT
518: INPUT UNIT
519: COMMUNICATION UNIT
520: DRIVE
531: MAGNETIC DISC
532: OPTICAL DISC
533: MAGNETO-OPTICAL DISC
534: SEMICONDUCTOR MEMORY

COMMUNICATION APPARATUS, COMMUNICATION METHOD AND PROGRAM

BACKGROUND OF THE INVENTION

1. Field of the Invention

The present invention relates to a communication apparatus, a communication method and a program. In particular, the present invention relates to a communication apparatus, a communication method and a program that are capable of transmitting and receiving digitalized audio data and digitalized video data by adopting an ATM communication technology.

2. Description of the Related Art

FIG. 1 shows a typical configuration of the conventional data transmission system for transmitting data by way of an ATM (Asynchronous Transfer Mode) network 4.

In accordance with this conventional data transmission system, data can be exchanged without being affected by a delay introduced into the data of a transport stream transmitted by the way of the network 4. The introduced delay (hereinafter referred to as delay fluctuation) is in the typical range of 1 to 2 ms.

It is to be noted that the conventional data transmission system is disclosed in the Japanese Patent Laid-open No. 2000-358006.

A plurality of encoders 1 (in this case, four encoders, namely, the encoders 1-1 to 1-4) each encodes a predetermined program data to be transmitted (video data, audio data and so forth), in accordance with an MPEG-2 technique, and outputs the encoded data to a multiplexer 2.

The multiplexer 2 packetizes data received from the encoders 1-1 to 1-4 to generate transport packets.

FIG. 2 shows a typical configuration of a transport packet. The transport packet is a packet with a fixed length of 188 bytes and includes a header portion, an adaptation field portion and a payload portion.

In the header portion, there are described a synchronization byte (8 bits), an error display (1 bit), a unit start display (1 bit), a transport-packet priority (1 bit), a PID (Packet Identification) (13 bits), a scramble control (2 bits), an adaptation-field control (2 bits) and a cyclic counter (4 bits).

Typically, the synchronization byte is set at 47h.

The PID is stream identification information. As shown in FIG. 3, the PID shows attributes of an individual stream in a packet. For example, a PID having a value of 0×0000 indicates that the transport packet includes a PAT. The PAT (Program Association Table) is the PID of a PMT (Program Map Table) showing the PID of a transport packet for storing data of a program (video data, audio data and so forth). A PID having a value in the range 0×0010 to 0×1FFE indicates that the transport packet includes data of a program.

Referring back to FIG. 2, the adaptation field portion includes an adaptation-field length (8 bits), a discontinuity display (1 bit), a random access display (1 bit), a stream priority display (1 bit), a flag (5 bits), a program clock reference base (33 bits), a reserve (6 bits) and a program clock reference extension (9 bits). It is to be noted that the flag includes 5 kinds of flags including a PCR flag (1 bit).

The payload portion stores data.

Referring back to FIG. 1, the multiplexer 2 multiplexes generated transport packets to create a transport stream (in this case, a transport stream generated from transport packets of 4 channels) and outputs the stream to the transmission apparatus 3.

The multiplexer 2 includes a PCR (Program Clock Reference) value in a predetermined transport packet as a time stamp. The PCR value is a count value obtained as a result of counting the number of system clock Se pulses like ones shown in FIG. 4A with a timing to output the predetermined transport packet to the transmission apparatus 3. In the case of the MPEG-2 technique, the frequency of the system clock Se pulses is 27 MHz. A transport packet including such a PCR value is referred to hereafter as a PCR packet. It is to be noted that the transport stream transmitted to a reception apparatus 5 includes PCR packets created at intervals smaller than 0.1 second.

A PCR value is expressed as a combination of the value of the program clock reference base (33 bits) and the value of the program clock reference extension (9 bits) in the adaptation field portion (FIG. 2). That is, the PCR value has a length of 42 bits which is a sum total of the program clock reference base and the program clock reference extension and represents the counted number of 27-MHz system clock pulses is a time in a day (24 hours).

It is to be noted that in the program clock reference base, a value from 0 to 299 is set (counted) in sequentially. When the value of the program clock reference base is turned (reset) from 299 back to 0, the value of the program clock reference extension is incremented by 1.

As shown in FIG. 2, the adaptation-field control of 10 or 11 is described in the header portion of a PCR packet. In the adaptation field, an adaptation-field length having a value greater than 00h is described and a PCR flag is set at 1.

The transmission apparatus 3 converts a transport stream received from the multiplexer 2 into ATM cells and transmits the cells to the reception apparatus 5 via a network 4. At that time, the transmission apparatus 3 expresses a PCR packet's timing of arrival at the transmission apparatus 3 from the multiplexer 2 by a count value obtained as a result of counting the number of clock Ns pulses (27 MHz) of the transmission apparatus 3, which are synchronous with network clock pulses (8 KHz) of the network 4. Then, the transmission apparatus 3 computes a difference in phase (phase-difference information) between the system clock signal Se (27 MHz) of the multiplexer 2 and the clock signal Ns on the basis of the count value of clock pulses Ns and the PCR value of the PCR packet. The transmission apparatus 3 records the difference in phase in the PCR packet as synchronization information.

The transmission apparatus 3 computes synchronization information for each PID (FIG. 3) to manage synchronization information. In the case of this example, since up to 8,192 programs can be transmitted, synchronization information is processed for each of the programs.

The reception apparatus 5 receives the transport stream transmitted through the network 4 and supplies the stream to a set top box (IRD (Integrated Receiver)) 6.

At that time, the reception apparatus 5 expresses a PCR packet's timing of output from the transmission apparatus 3 (timing of arrival at the reception apparatus 5) by a count value obtained as a result of counting the number of clock Nr pulses (27 MHz), which are synchronous with network clock pulses of the network 4. The reception apparatus 5 generates a new PCR value required for synchronizing a system clock signal Sd of the set top box 6 (decoding side) with the system clock signal Se on the basis of the count value of clock Nr pulses and the phase-difference information which has been recorded in the PCR packet as synchronization information (difference in phase between the system clock signal Se and the clock signal Ns). The reception apparatus 5 records the newly generated PCR value as a substitute for a PCR value included in the PCR packet from the beginning.

Much like the synchronization information computation processing carried out by transmission apparatus 3, the reception apparatus 5 carries out above-described PCR value renewal processing for each PID. In this case, the PCR value renewal processing is carried out for each of the 8,192 programs at the maximum.

The set top box 6 fetches the PCR value (newly stored PCR value) from the PCR packet. The set top box 6 adjusts the phase of the system clock signal Sd on the basis of the PCR value to establish synchronization of the system clock signal Sd with the system clock signal Se on the encoding side.

The set top box 6 uses the system clock signal Sd synchronized with the system clock signal Se to decode data of a channel selected by the user among data received from the reception apparatus 5.

The data decoded by the set top box 6 is typically output to the monitor 7 to be displayed thereon.

As described above, the transmission apparatus 3 generates the phase-difference information between the PCR value (count value of system clock pulses Se) and the clock signal Ns synchronous with the network clock pulses of the network 4 on the basis of the PCR value and the count value. The reception apparatus 5 generates a new PCR value on the basis of the phase-difference information and a count value obtained as a result of counting the number of clock pulses Nr synchronous with the PCR value of a PCR packet (count value of system clock pulses Se) and the clock pulses Ns, (synchronous with the network clock pulses of the network 4). The PCR value already recorded in the PCR packet is a count value obtained as a result of counting the number of system clock pulses Se. Thus, on the decoding side, it is possible to generate a system clock signal Sd synchronous with the system clock signal Se of the encoding side without being affected by delay fluctuations introduced in the course of the data transmission. As a result, the transport stream transmitted by way of the network 4 can be reproduced properly.

By the way, in the embodiment shown in FIG. 1, the transmission apparatus 3 and the reception apparatus 5 are connected to a network 4, and use a network clock signal of the network 4. Thus, the clock signal Ns of the transmission apparatus 3 and the clock signal Nr of the reception apparatus 5 can be synchronized with each other.

As shown in FIG. 5 for example, however, the transmission apparatus 3 and the reception apparatus 5 are connected to respectively networks 4-1 and 4-2, which are different from each other. In this case, if the networks 4-1 and 4-2 use different network clock signals, normally, these clock signals are not synchronized with the other. Consequently, clock signals Nr and Ns cannot be synchronized with the other. As a result, with the method described above, it is impossible to absorb delay fluctuations introduced in the course of data transmission through the networks 4-1 and 4-2.

Thus, in this case, a difference between a new PCR value generated in the reception apparatus 5 as described above and the original PCR value (count value of the system clock pulses Se) is cumulated with the lapse of time, increasing the shift quantity of data stored in a multiplexed buffer (VBV) (not shown) employed in the set top box 6. When the shift quantity exceeds a predetermined value, the multiplexing buffer VBV fails.

In accordance with ITUT G.811, the precision of the network clock signal is 1E-11, which is the same as the precision of a cesium atomic oscillator. Assume that, with the shift relative to the original PCR value becoming equal to 1 ms, the multiplexing buffer fails. In this case, an equation given below provides a computation result of 5E7 seconds, which mean that the multiplexing buffer fails at least once in about 1.5 years.

$$(1+1E-11)/(1-1E-1)=2E-11$$

$$2E-3/2E-11=5E7$$

As is obvious from the above description, in the conventional system wherein the transmission apparatus 3 and the reception apparatus 5 are connected to respectively the networks 4-1 and 4-2 having network clock signals not synchronous with each other, a transmitted transport stream cannot be reproduced correctly.

In addition, as shown in FIG. 6, if multiplexing is carried out repeatedly by a plurality of multiplexers 2 (in this case, three multiplexers 2-1 to 2-3) using system clock signals Se asynchronous with each other, PCR jitters are generated.

The multiplexer 2-1 adds PCR values to a transport stream received from the encoder 1. In other words, this addition means conversion of a clock signal A of the encoder 1 into a system clock signal Se-1 of the multiplexer 2-1. As a result, for example, clock pulses "a" in the clock signal "a" counted with timings shown in FIG. 7A is counted with timings, as shown in FIG. 7B, shifted from the timings in the clock signal a by 0.5 clock pulses in the left direction (in the lagging direction along the time axis) in the system clock signal Se-1. Since the PCR value is an integer, PCR jitters of 0.5 clock pulses are generated in this case.

In addition, the system clock signal Se-1 of the multiplexer 2-1 is converted into a system clock signal Se-2 of the multiplexer 2-2 so that, the number of clock pulses "a" in the system clock signal Se-2 signal is counted with timings further shifted by 0.2 clock pulses in the left direction as shown in FIG. 7C. Moreover, the system clock signal Se-2 of the multiplexer 2-2 is converted into a system clock signal Se-3 of the multiplexer 2-3 so that, the number of clock pulses "a" in the system clock signal Se-3 signal is counted with timings further shifted by 0.3 clock pulses in the left direction as shown in FIG. 7D.

As a result, in the example shown in FIG. 7, the timing to count the number of clock pulses "a" is shifted in the left direction by 1 clock pulse so that jitters of 1 clock pulse are generated.

As described above, if multiplexing is carried out repeatedly by a plurality of asynchronous multiplexers 2, PCR jitters are generated. Thus, the multiplexing buffer fails. As a result, the transmitted transport stream cannot be reproduced correctly.

See, for example, Japanese Patent Laid-open No. 2000-358006.

As described above, in the conventional network system, there is raised a problem that a transmitted transport stream cannot be reproduced correctly.

BRIEF SUMMARY OF THE INVENTION

A communication apparatus according to the present invention is characterized in that it includes first computation means for computing a second time stamp on the basis of a difference in phase between a clock of a first time stamp and a predetermined first clock and on the basis of a count value obtained as a result of counting the number of predetermined second clocks with a timing of inputting processed data having the first time stamp wherein the difference in phase is generated over a predetermined period of time, second computation means for computing a third time stamp by removing a shift between a reference clock and the second time stamp from the second time stamp wherein the shift is generated during a period of time till the processed data is input and renewal means for renewing the first time stamp written in the processed data with the third time stamp.

The communication apparatus according to the present invention may further include reception means for receiving the processed data transmitted by way of a first network to which the communication apparatus is connected and by way of a second network connected to the first network, wherein the first clock is a clock synchronized to a network clock of the first network and the second clock is a clock synchronized to a network clock of the second network.

The second computation means may compute a next one of the third time stamp by adding a correction value based on a result of comparison of the third time stamp with the first time stamp to the second time stamp from which a shift between the reference clock and the second time stamp has been removed wherein the shift is generated during a period of time till the processed data is input.

The second computation means may compute a next one of the third time stamp by adding a correction value based on a result of comparison of the second time stamp with the first time stamp to the second time stamp from which a shift between the reference clock and the second time stamp has been removed wherein the shift is generated during a period of time till the processed data is input.

The second computation means may compute a next one of the third time stamp by adding a correction value based on a result of comparison of the third time stamp with the second time stamp to the second time stamp from which a shift between the reference clock and the second time stamp has been removed wherein the shift is generated during a period of time till the processed data is input.

The first computation means may compute a next one of the second time stamp by adding a correction value based on a result of comparison of the third time stamp with the first time stamp to the first time stamp from which a shift between a clock of the first time stamp and the first clock has been removed wherein the shift is generated during a period of time till the processed data is input and the second computation means may compute a next one of the third time stamp by adding a correction value based on a result of comparison of the first time stamp with the second time stamp to the second time stamp from which a shift between the reference clock and the second time stamp has been removed wherein the shift is generated during a period of time till the processed data is input.

The communication apparatus according to the present invention may further include multiplexing control means for controlling a process to multiplex the processed data, wherein the first clock is a clock representing a timing of the process carried out by the multiplexing control means to multiplex the processed data, the second clock is a clock output by a VCXO and the first computation means computes the difference in phase on the basis of a difference between the first clocks' clock count representing a time it takes to carry out the process of multiplexing the processed data and the first time stamp's clock count representing an average of pre-computed times it takes to carry out the process of multiplexing the processed data, and computes the second time stamp on the basis of the computed difference in phase and a count value obtained as a result of counting the number of second clocks with a timing of inputting the processed data.

A communication method according to the present invention is characterized in that it includes a first computation step of computing a second time stamp on the basis of a difference in phase between a clock of a first time stamp and a predetermined first clock and on the basis of a count value obtained as a result of counting the number of predetermined second clocks with a timing of inputting processed data having the first time stamp wherein the difference in phase is generated over a predetermined period of time, a second computation step of computing a third time stamp by removing a shift between a reference clock and the second time stamp from the second time stamp wherein the shift is generated during a period of time till the processed data is input and a renewal step of renewing the first time stamp written in the processed data with the third time stamp.

A program according to the present invention is characterized in that the processing of the program includes a first computation control step of controlling computation of a second time stamp on the basis of a and a predetermined first clock and on the basis of a count value obtained as a result of counting the number of predetermined second clocks with a timing of inputting processed data having the first time stamp wherein the difference in phase is a generated over a predetermined period of time, a second computation control step of controlling computation of a third time stamp by removing a shift between a reference clock and the second time stamp from the second time stamp wherein the shift is generated during a period of time till the processed data is input and a renewal control step of controlling renewal of the first time stamp written in the processed data with the third time stamp.

In a communication apparatus, a communication method and a program according to the present invention, a second time stamp is computed on the basis of a difference in phase between a clock of a first time stamp and a predetermined first clock and on the basis of a count value obtained as a result of counting the number of predetermined second clocks with a timing of inputting processed data having the first time stamp wherein the difference in phase is generated over a predetermined period of time, a third time stamp is computed by removing a shift between a reference clock and the second time stamp from the second time stamp wherein the shift is generated during a period of time till the processed data is input and the first time stamp written in the processed data is renewed with the third time stamp.

BRIEF DESCRIPTION OF THE DRAWINGS

FIG. 3 is an explanatory diagram showing a PID.

FIG. 4 is an explanatory diagram showing system clock signals on encoding and decoding sides.

FIG. 8 is a block diagram showing a typical configuration of a data transmission system to which the present invention is applied.

FIG. 9 is a block diagram showing a typical configuration of a transmission apparatus shown in FIG. 8.

FIG. 10 is a block diagram showing a typical configuration of a phase comparator of a PLL circuit shown in FIG. 9.

FIG. 11 shows a flowchart describing a synchronization establishment processing carried out by a synchronization unit shown in FIG. 9.

FIG. 12 is a diagram showing state transitions of the synchronization unit shown in FIG. 9.

FIG. 13 shows a flowchart describing a synchronization-information generation processing carried out by a synchronization information-processing unit shown in FIG. 9.

FIG. 14 shows timing charts explaining a synchronization-information generation processing.

FIG. 15 is an explanatory diagram showing synchronization information.

FIG. 16 is a block diagram showing a typical configuration of a reception apparatus shown in FIG. 8.

FIG. 17 is a block diagram showing a typical configuration of an adaptive clock unit shown in FIG. 16.

FIG. 18 is an explanatory diagram showing comparison values.

FIG. 19 shows a flowchart describing a PCR-renewal processing carried out by a PCR renewal unit shown in FIG. 16.

FIG. 20 shows a flowchart describing the step S41 shown in FIG. 19.

FIG. 21 is an explanatory diagram showing ΔE.

FIG. 22 is an explanatory diagram showing offset values.

FIG. 23 shows timing charts explaining a PCR-renewal processing.

FIG. 24 shows a flowchart describing a PCR-renewal processing carried out by a PCR renewal unit shown in FIG. 16.

FIG. 25 shows an explanatory diagram explaining the step S81 shown in FIG. 24.

FIG. 26 shows an explanatory diagram explaining the step S82 shown in FIG. 24.

FIG. 27 shows an explanatory diagram explaining the step S84 shown in FIG. 24.

FIG. 28 shows another explanatory diagram explaining the step S84 shown in FIG. 24.

FIG. 29 is a block diagram showing another typical configuration of the reception apparatus shown in FIG. 8.

FIG. 30 is an explanatory diagram showing other comparison values.

FIG. 31 shows a flowchart describing a PCR-renewal processing carried out by a PCR renewal unit shown in FIG. 29.

FIG. 32 is a block diagram showing a further typical configuration of the reception apparatus shown in FIG. 8.

FIG. 33 is an explanatory diagram showing further comparison values.

FIG. 34 shows a flowchart describing a PCR-renewal processing carried out by a PCR renewal unit shown in FIG. 32.

FIG. 35 is an explanatory diagram describing the step S107 shown in FIG. 34.

FIG. 36 is a block diagram showing a still further typical configuration of the reception apparatus shown in FIG. 8.

FIG. 37 is an explanatory diagram showing still further comparison values.

FIG. 38 is a block diagram showing another typical configuration of the data transmission system to which the present invention is applied.

FIG. 39 is a block diagram showing a typical configuration of a multiplexer shown in FIG. 38.

FIG. 40 is an explanatory diagram describing a time stamp.

FIG. 41 shows a flowchart describing a PCR-renewal processing carried out by a PCR renewal unit shown in FIG. 39.

FIG. 42 is an explanatory diagram describing the step S111 shown in FIG. 41.

FIG. 43 is an explanatory diagram describing the step S112 shown in FIG. 41.

FIG. 44 is an explanatory diagram showing still further comparison values.

FIG. 45 is a block diagram showing another typical configuration of a multiplexer shown in FIG. 38.

FIG. 46 shows a flowchart describing a discontinuity detection processing carried out by a detection unit shown in FIG. 45.

FIG. 47 shows timing charts explaining a discontinuity detection processing.

FIG. 48 is a block diagram showing a typical configuration of a computer 501.

DETAILED DESCRIPTION OF THE INVENTION

Figure 5:
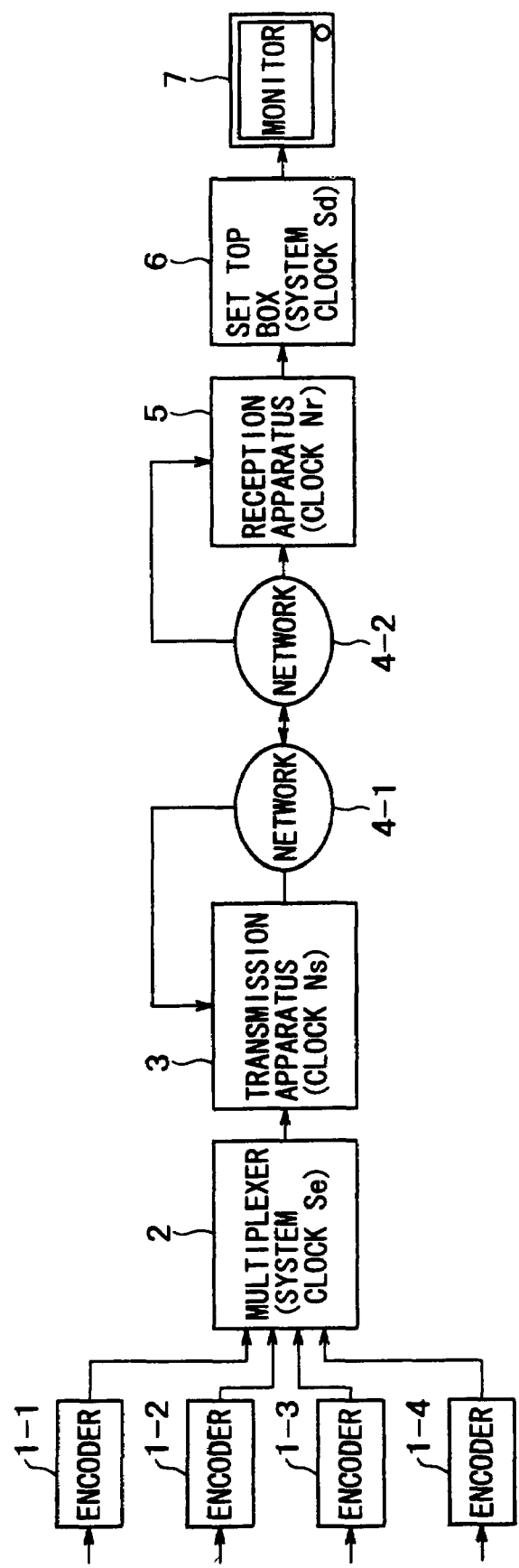
FIG. 5 is a block diagram showing a typical configuration of the conventional data transmission system.
Figure 6:
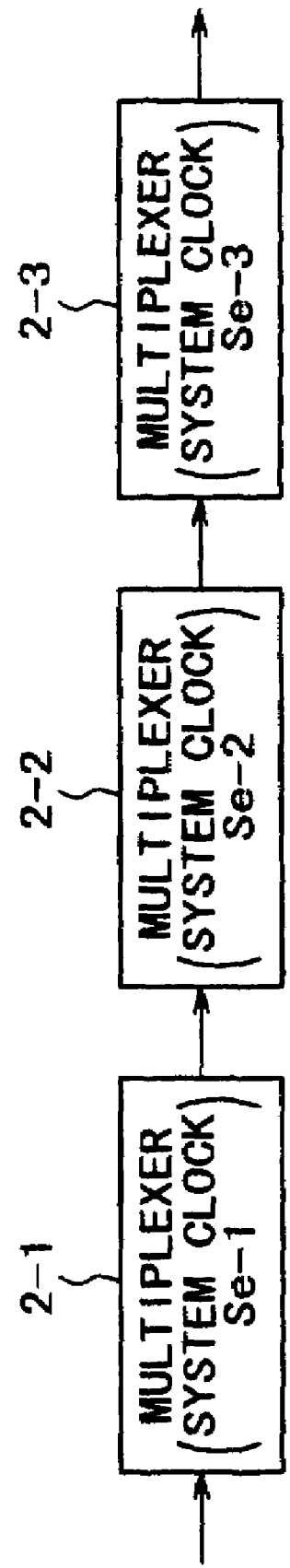
FIG. 6 is a diagram showing a typical connection of a plurality of multiplexers.
Figures 7A, 7B, 7C, 7D:
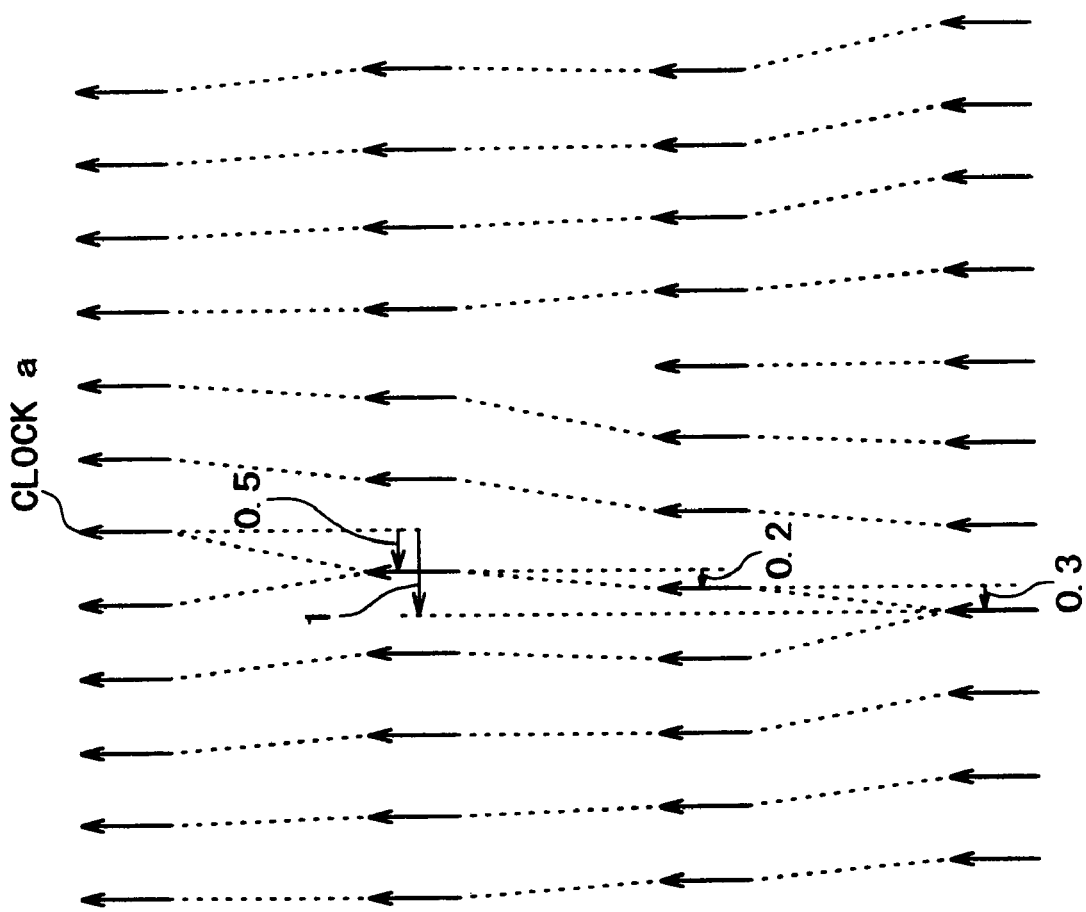
FIG. 7 is an explanatory diagram describing operations of a plurality of multiplexers.

FIG. 8 shows a typical configuration of a data transmission system to which the present invention is applied. The data transmission system includes a transmission apparatus 21 and a reception apparatus 22 as substitutes for respectively the transmission apparatus 3 and the reception apparatus 5, which are employed in the data transmission system shown in FIG. 5. Since other components are identical with their counterparts employed in the data transmission system shown in FIG. 5, their explanation is not repeated.

The transmission apparatus 21 and the reception apparatus 22 are connected to respectively ATM networks 4-1 and 4-2, which each has an asynchronous network clock signal. In an ATM transmission from the West Coast to the East Coast in the United States or an ATM transmission over a plurality of countries in Europe, for example, data is transmitted by way of a plurality of networks 4 as shown in FIG. 8.

The transmission apparatus 21 converts a transport stream received from a multiplexer 2 into ATM cells and transmits the ATM cells to the reception apparatus 22 by way of the networks 4-1 and 4-2.

In this case, the transmission apparatus 21 expresses an arrival timing of a PCR packet received from the multiplexer 2 in terms of a count value obtained as a result of counting the number of clock pulses (clock Ns) of the transmission apparatus 21, which are synchronous with a network clock signal of the network 4-1. Then, the transmission apparatus 21 finds the phase-difference information on the basis of the count value of the clock Ns and a PCR value E of the PCR packet. The transmission apparatus 21 then adds the phase-difference information to the PCR packet as synchronization information. This phase-difference information is required for eliminating fluctuations introduced in the course of a transmission through the network 4-1.

The transmission apparatus 21 carries out the phase-difference information computation processing for each PID (FIG. 3). That is, in this case, the phase-difference information computation processing is carried out for each PID of up to 8,192 programs.

The reception apparatus 22 receives ATM cells transmitted by way of the networks 4-1 and 4-2 and converts the ATM cells into a transport stream.

In the processing to receive the ATM cells, the reception apparatus 22 expresses an arrival timing of each of the PCR packets in terms of a count value obtained as a result of counting the number of clock pulses (clock Nr), which are synchronous with a network clock signal of the network 4-2. The transmission apparatus 21 also finds a new PCR value W based on the phase-difference information written in the PCR packet and used as the synchronization information and the count value.

By using this PCR value W, it is possible to eliminate delay fluctuations introduced in the course of transmission through the network 4-1. However, it is not possible to eliminate delay fluctuations introduced in the course of transmission through the network 4-2.

The reception apparatus 22 removes a shift, generated during a period of time till a packet is input, between an internally generated reference clock signal (VCXO) and the PCR value W from the PCR value W to find a new PCR value X. Then, the reception apparatus 22 records the new PCR value X into the PCR packet in place of the PCR value W. The computation method will be described hereinafter FIG. 9 shows a typical configuration of the transmission apparatus 21. A transport stream supplied from the multiplexer 2 to the transmission apparatus 21 is input to a synchronization unit 31. The synchronization unit 31 establishes packet synchronization of the input transport stream and passes on the transport stream to a PCR-packet detection unit 32.

Figure 2:
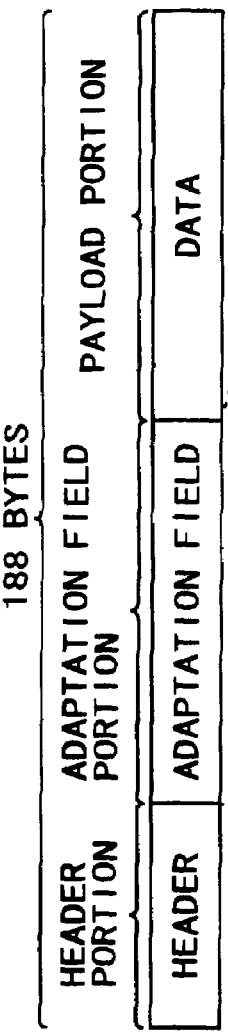
FIG. 2 is an explanatory diagram showing a PCR.

The PCR-packet detection unit 32 detects a PCR packet among transport packets input from the synchronization unit 31 by formation of a judgment as to whether data peculiar to a PCR packet is set in the PCR packet's header portion and adaptation field portion, which are shown in FIG. 2. Then, the PCR-packet detection unit 32 outputs a signal (hereinafter referred to as PCR-packet detection signal) with a timing of detection of a PCR packet to a synchronization-information-processing unit 33.

It is to be noted that the PCR-packet detection unit 32 passes on the input transport stream to the synchronization-information-processing unit 33 as it is without processing the stream itself.

A transport stream and a PCR-packet detection signal are input from the PCR-packet detection unit 32 to the synchronization-information-processing unit 33. The clock pulses Ns (27 MHz) synchronous with the clock signal of the network 4-1 is input from a PLL circuit 36 to the synchronization-information-processing unit 33.

The synchronization-information-processing unit 33 has a counter 33A for counting the number of clock pulses Ns for each 24-hour time unit and a counter 33B for counting the number of clock pulses Ns for each predetermined time unit (typically 0.12 second). To put it in detail, at the end of each 24-hour time unit, the counter 33A resets its count value obtained as a result of counting the number of clock pulses Ns for the 24-hour time unit. At the end of each predetermined time unit of (0.12 second), the counter 33B resets its count value obtained as a result of counting the number of clock pulses Ns (3,240,000=27,000,000×0.12) for the predetermined time unit.

As will be described later, the synchronization-information-processing unit 33 computes a difference in phase between a system clock pulse Se (multiplexer 2) and a clock pulse Ns (transmission apparatus 21) generated over a predetermined period of time on the basis of the PCR value E of a PCR packet, the count value of the counter 33A and the count value of the counter 33B. The synchronization-information-processing unit 33 writes the computed difference in phase into the PCR packet as synchronization information.

The synchronization-information-processing unit 33 outputs the transport stream including PCR packets each having the synchronization information to an MPEG/ATM conversion unit 35.

A memory 34 is used for storing data supplied from the synchronization-information-processing unit 33 and required for computation of the synchronization information in the synchronization-information-processing unit 33. Since the synchronization-information-processing unit 33 carries out the synchronization-information computation processing for each PID (for example, for each program), the memory 34 is also used for storing data supplied from the synchronization-information-processing unit 33 for each PID.

The MPEG/ATM conversion unit 35 converts the transport stream into ATM cells and then outputs the ATM cells to the network 4-1. The MPEG/ATM conversion unit 35 also receives ATM cells sequentially sent from the network 4-1 and generates an 8-KHz clock signal synchronous with the network clock signal of the network 4-1 on the basis of the received ATM cells. The MPEG/ATM conversion unit 35 outputs the generated 8-KHz clock signal to a PLL circuit 36.

Typically, the PLL circuit 36 has a phase comparator 41 like one shown in FIG. 10. A VCO 51 employed in the phase comparator 41 generates clock pulses having a predetermined phase and a frequency of 27 MHz (clock pulses Ns) on the basis of a signal supplied from a phase comparison unit 52, outputting the clock pulses Ns to the synchronization-information-processing unit 33 and a frequency divider 53. The frequency divider 53 divides the 27-MHz frequency clock pulses by 3,375 to generate a clock signal having a frequency of 8 KHz. The frequency divider 53 outputs the generated clock signal to the phase comparison unit 52. The phase comparison unit 52 compares the phase of the 8 KHz clock signal received from the MPEG/ATM conversion unit 35 with the phase of the 8 KHz clock signal received from the frequency divider 53 and outputs a result of the comparison to the VCO 51. That is, the phase of the clock pulses Ns output to the synchronization-information-processing unit 33 is adjusted to synchronize the clock pulses Ns with the network clock signal of the network 4-1.

The operation of the synchronization unit 31 of the transmission apparatus 21 is explained by referring to a flowchart shown in FIG. 11 as follows. At the step S1, the synchronization unit 31 fetches the data of input transport stream in bytes units. Then, the synchronization unit 31 enters a state of waiting for an outcome of a judgment to indicate that a byte of data fetched from an input transport stream is equal to 47h, which is the value of a synchronization byte (FIG. 2). As a byte of data fetched from an input transport stream is determined to be equal to 47h, the flow of the program goes on to a step S2 at which the synchronization unit 31 sets a counter "i", for counting the number of times a 47h data byte has been detected, at an initial value of 1.

Then, at the next step S3, the synchronization unit 31 fetches a data byte lagging behind the 47h data byte fetched at the step S1 by 188 bytes (188th byte after the 47h byte). At the step S4, the synchronization unit 31 forms a judgment as to whether or not the data byte fetched at the step S3 is also a 47h byte.

If the outcome of the judgment formed at the step S4 indicates that the data byte fetched at the step S3 is not a 47h byte, the flow of the program goes back to the step S1 at which the synchronization unit 31 carries out the processing of this step and the subsequent steps. If the outcome of the judgment formed at the step S4 indicates that the data byte fetched at the step S3 is a 47h byte, on the other hand, the flow of the program goes on to a step S5 at which the synchronization unit 31 carries out the processing of this step.

At the step S5, the synchronization unit 31 forms a judgment as to whether or not the value of the counter "i" is equal to 5 (whether or not the 47h data byte has been fetched consecutively five times at intervals of 188 bytes starting from the position of the 47h data byte fetched at the step S1). If the outcome of the judgment indicates that the value of the counter "i" is not equal to 5, the flow of the program goes on to a step S6 at which the value of the counter "i" is incremented by 1. Then, the flow of the program goes back to the step S3 at which the synchronization unit 31 carries out the processing of this step and the subsequent steps.

If the outcome of the judgment formed at the step S5 indicates that the value of the counter "i" is equal to 5, the flow of the program goes on to a step S7 at which the synchronization unit 31 takes the position of the fifth fetched 47h data byte as a start position of a transport packet. That is, packet synchronization is established by taking the fifth fetched 47h data byte as a synchronization byte.

A transport packet is a packet having a fixed length of 188 bytes. The synchronization byte (47) is described at the first byte of a transport packet which can be detected in the way described above.

It is to be noted that data supplied to the transmission apparatus 21 prior to the establishment of the frame synchronization at the step S7 is discarded instead of being passing on to the PCR-packet detection unit 32.

After the frame synchronization is established as described above, the flow of the program goes on to a step S8 at which the synchronization unit 31 sets the counter "i" at the initial value of 1. Then, at the next step S9, the synchronization unit 31 fetches a data byte lagging behind the 47h data byte by 188 bytes (188th byte after the 47h byte) as the synchronization byte. Subsequently, the flow of the program goes on to the next step S10 to form a judgment as to whether or not the data byte fetched at the step S9 is also a 47h byte.

If the outcome of the judgment formed by the synchronization unit 31 at the step S10 indicates that the data byte fetched at the step S9 is a 47h byte, that is, if synchronization bytes are detected at an interval of 188 bytes or the frame synchronization is determined to be sustainable, the flow of the program goes back to the step S9 at which the processing of this step and subsequent steps is carried out again.

If the outcome of the judgment formed by the synchronization unit 31 at the step S10 indicates that the data byte fetched at the step S9 is not a 47h byte, or the flame synchronization is disturbed, on the other hand, the flow of the program goes on to a step S11.

At the step S11, the synchronization unit 31 forms a judgment as to whether or not the value of the counter "i" is equal to 3. If the value of the counter "i" is determined to be unequal to 3, the flow of the program goes on to a step S12 at which the value of the counter "i" is incremented by 1. Then, the flow of the program goes back to the step S9 at which the synchronization unit 31 carries out the processing of this step and the subsequent steps.

If the outcome of the judgment formed at the step S11 indicates that the value of the counter "i" is equal to 3, on the other hand, the flow of the program goes back to the step S1 at which the synchronization unit 31 again carries out the processing of this step and the subsequent steps. That is, if the outcome of the judgments formed by the synchronization unit 31 indicate that the data byte fetched at the step S9 is not a 47h byte three times in a row, the frame synchronization of the transport stream is considered to be unestablished. In this case, the flow of the program goes back to the step S1 at which the synchronization unit 31 again carries out the processing of this step and the subsequent steps to reestablish synchronization. It is to be noted that data of 3×188 bytes, which has been received before the processing to reestablish synchronization is carried out (before the flow of the program goes back to the step S1), is supplied to the PCR-packet detection unit 32 as it is albeit it is assumed that synchronization is not established.

FIG. 12 is a state-transition diagram showing the operation of the synchronization unit 31 described above. Initially, the synchronization unit 31 is in a hunting state, (initial state). In this state, the synchronization unit 31 fetches data from a transport stream in byte units. The synchronization unit 31 examines the fetched data byte to determine whether or not the data byte is a 47h byte, which is a synchronization byte (step S1). If the data byte is determined to be a 47h synchronization byte, the synchronization unit 31 transits to a pre-synchronization state.

The synchronization unit 31 transits from the pre-synchronization state to an established-synchronization state if the synchronization unit 31 determines that the 47h data byte has been counted consecutively a predetermined number of times "x" (five times in this case) at intervals of 188 bytes starting from the position of the 47h data byte fetched in the hunting state (steps S2, S3, S4 and S5). However, if the 47h data byte has not been counted a predetermined number of times, that is, a data byte other than the 47h data byte is fetched at such an interval, the synchronization unit 31 returns to the hunting state.

In the established-synchronization state, the synchronization unit 31 establishes frame synchronization of the transport stream by taking the position of the fifth 47h data byte fetched in the pre-synchronization state as the beginning of the transport packet (step S7). Then (at the steps S8, S9, S10, S11 and S12), the synchronization unit 31 enters a state of waiting for a counted number of times a data byte other than the 47h data byte has been fetched consecutively at intervals of 188 bytes starting from the position of the fifth 47h data byte fetched in the hunting state to reach a predetermined number of times y (three times in the case of this example). As the counted number of times reaches the predetermined number of times, the synchronization unit 31 transits to the hunting state.

As described above, the synchronization unit 31 appropriately transfers among the hunting state, the pre-synchronization state and the established-synchronization state to establish frame synchronization of the transport stream.

Next, the synchronization-information computation processing by the synchronization-information-processing unit 33 (FIG. 9) employed in the transmission apparatus 21 is explained by referring to a flowchart shown in FIG. 13. It is to be noted that, in the following description, processing to generate synchronization information for only one PID is explained. In actuality, however, the same processing is carried out for each PID.

When a first PCR packet is detected at the step S21, for example, the synchronization-information-processing unit 33 computes a clock Ns reference value and an offset value O at the step S22.

As shown in FIG. 14A, the details are explained concretely by taking a case, in which a PCR packet K1 is detected, as an example. The synchronization-information-processing unit 33 at first acquires a PCR value E1 of the PCR packet K1 and uses the PCR value E1 as a clock Se reference value as shown in FIG. 14B.

In addition, the synchronization-information-processing unit 33 takes a count value N1, which is contained in the counter 33A when the PCR packet K1 is detected, as the clock Ns reference value. The clock Ns reference value and the clock Se reference value are used for finding an offset value O (FIG. 14A) in accordance with equation (1) as follows:

Clock Se reference value=Clock Ns reference value+ Offset O  (1)

It is to be noted that, as shown in FIG. 14C, the synchronization-information-processing unit 33 resets the count value of the counter 33B with a timing of the count value of the counter 33A becoming equal to the clock Se reference value as shown in FIG. 14A.

Then, at the next step S23, the synchronization-information-processing unit 33 stores the clock Ns reference value and the offset value O, which were found at the step S22, in the memory 34 by associating the clock Ns reference value and the offset value O with the PID of a program being processed.

Subsequently, at the next step S24, the synchronization-information-processing unit 33 enters a state of waiting for the next PCR packet to be detected. As the next PCR packet is detected, the flow of the program goes on to a step S25.

At the step S25, the synchronization-information-processing unit 33 forms a judgment as to whether or not the PCR packet detected at the step S24 is a PCR packet detected before the count value of the counter 33B becomes equal to 3,240,000. As described above, the count value of the counter 33B has been reset with a timing of the count value of the counter 33A becoming equal to the clock Se reference value. If the outcome of the judgment indicates that the PCR packet has been detected before the count value of the counter 33B becomes equal to 3,240,000, the flow of the program goes on to a step S26.

In the example shown in FIG. 14, the next PCR packet K2 is a PCR packet detected before the count value of the counter 33B, which has been reset with a timing of the count value of the counter 33A becoming equal to the clock Se reference value (the same value as the PCR value E1), becomes equal to 3,240,000. Thus, the flow of the program goes on to the step S26.

At the step S26, the synchronization-information-processing unit 33 sets a value of −128 as synchronization information in a synchronization byte of the header portion of the PCR packet (for example, the PCR packet K2) detected at the step S24. Details of the processing carried out at the step S26 will be described later.

Then, the flow of the program goes back to the step S24 by way of steps S29 and S30, which will be described later.

If the outcome of the judgment formed at the step S25 indicates that the PCR packet detected at the step S24 is not a PCR packet detected before the count value of the counter 33B, which has been reset with a timing of the count value of the counter 33A becoming equal to the clock Se reference value, becomes equal to 3,240,000, on the other hand, the flow of the program goes on to a step S27.

In the example shown in FIG. 14, the next PCR packet K3 is not a PCR packet detected before the count value of the counter 33B, which has been reset with a timing of the count value of the counter 33A becoming equal to the clock Se reference value (the same value as the PCR value E1), becomes equal to 3,240,000 (the next PCR packet K3 is a PCR packet detected after the count value of the counter 33B becomes equal to 3,240,000 to be reset). Thus, the flow of the program goes on to the step S27 when the PCR value K3 is detected.

In accordance with the MPEG-2 method, PCR packets are transmitted at a rate of at least a packet per 0.1 second. Thus, in the case of the example shown in FIG. 14, the next PCR packet K3 is detected within a period between two consecutive operations (0.12 second (=3,240,000/27,000,000)) to reset the count value of the counter 33B when the count value reaches 3,240,000 after the PCR packet K2 is detected.

At the step S27, the synchronization-information-processing unit 33 finds synchronization information to be written into a PCR packet detected at the step S24 (in the example shown in FIG. 14, the PCR packet K3). It is to be noted that, in the following description, a packet into which the calculated synchronization information is to be written into is referred to as an object PCR packet.

The following description concretely explains a case in which the object PCR packet is the PCR packet K3. In this case, the synchronization-information-processing unit 33 acquires the PCR value E3 of the PCR packet K3 and a count value N3, which is contained in the counter 33A when the PCR packet K3 is detected.

Then, the synchronization-information-processing unit 33 uses the count value N3 as a PCR value according to the clock pulses Ns and the PCR value E3 as a PCR value according to the system clock signal Se in calculation of the phase-difference information according to the following equation:

Phase-difference information=[[{(PCR value according to system clock signal Se−Clock Se reference value)−(PCR value according to clock pulses Ns−Clock Ns reference value)}×3,240,000]÷(PCR value according to clock pulses Ns−Clock Ns reference value)]

That is, the phase-difference information is a difference in phase between a system clock pulse Se and a clock pulse Ns. This difference in phase between a system clock pulse Se and a clock pulse Ns is generated over a period of time before the counted number of clock pulses Ns reaches 3,240,000 and is calculated on the basis of a previous difference in phase between a system clock pulse Se and a clock pulse Ns. The previous difference in phase between a system clock pulse Se and a clock pulse Ns is generated over a period of time from the clock Ns reference value (count value N1) to the PCR value according to the clock pulses Ns (count value N3). It is to be noted that, in accordance with the MPEG-2 specifications, a deviation of ±30 ppm (parts per million) is permitted for the system clock pulse Se and the clock pulses Ns. Thus, the calculated difference in phase between a system clock pulse Se and a clock pulse Ns is caused by this deviation.

Next, the synchronization-information-processing unit 33 divides the phase-difference information computed as described above by 2 and uses the result of the division as synchronization information.

After the synchronization information is calculated as described above, the flow of the program goes on to a step S28 at which the synchronization-information-processing unit 33 writes the synchronization information computed at the step S28 (½×phase-difference information) into the synchronization byte of the object PCR packet(in the example shown in FIG. 14, PCR packet K3).

As described above, the phase-difference information is a difference in phase between a system clock pulse Se and a clock pulse Ns. This difference in phase between a system clock pulse Se and a clock pulse Ns is generated over a period of time before the counted number of clock pulses Ns reaches 3,240,000 and is calculated on the basis of a previous difference in phase between a system clock pulse Se and a clock pulse Ns. The previous difference in phase between a system clock pulse Se and a clock pulse Ns is generated over a period of time from the clock Ns reference value (count value N1) to the PCR value according to the clock pulses Ns (count value N3).

That is, the phase-difference information is a difference in phase between a system clock pulse Se and a clock pulse Ns. This difference in phase between a system clock pulse Se and a clock pulse Ns is generated over a period of time of 0.12 (=3,240,000/27,000,000) second and is represented on the time axis of the system clock signal Se (time axis of the PCR value).

The phase-difference information becomes maximum when the frequency of the system clock signal Se is 27 MHz+810 Hz and the frequency of the clock pulses Ns is 27 MHz−810 Hz. This maximum value is 195, which is computed as follows:

$$((1+30\ ppm)/(1-30\ ppm)-1) \times 27\ \text{MHz} \times 0.12\ s \approx 195$$

It is to be noted that, in accordance with the above equation, the period of the clock pulses Ns (1/(27 MHz−810 Hz)) (time) is normalized (made compatible with the time axis of the PCR value) by the period of the system clock signal Se (1/(27 MHz+810 Hz)). Then, a difference between a time of the normalized clock pulse Ns (time of the clock pulse Ns made compatible with time axis of the PCR value) and a PCR time (1 unit) is found. Finally, the difference is used as a basis for finding a difference in phase between a system clock pulse Se and a clock pulse Ns in a period of 0.12 second.

On the other hand, the phase-difference information becomes minimum when the frequency of the system clock signal Se is 27 MHz−810 Hz and the frequency of the clock pulses Ns is 27 MHz+810 Hz. This minimum value is −195, which is computed as follows:

$$((1-30\ ppm)/(1+30\ ppm)-1) \times 27\ \text{MHz} \times 0.12\ s \approx -195$$

After all, since the phase-difference information is a value in the range of −195 to 195 and the synchronization information is obtained as a result of division of the phase difference by 2. Thus, the synchronization information can be stored in a byte by using the result of the division (−97.2 to 97.2). That is, since byte values in the range of −128 to 128 can be used, as shown in FIG. 15, the range of −128 to 128 includes values for representing information other than the difference in phase. Nevertheless, the range −125 to 125 broader than the range −97.2 to 97.2 is allocated to the phase-difference information, allowing a fixed margin to be provided for the difference in phase.

Referring back to the flowchart shown in FIG. 13, at a step S29, the synchronization-information-processing unit 33 subtracts 39h from the synchronization information written into the synchronization byte at the step S26 or S28. That is, the value of the synchronization byte of the PCR packet becomes a value referred to as "subtracted synchronization information" on a column of a table shown in FIG. 15. The value of the subtracted synchronization information is determined by the value of the synchronization information written into the synchronization byte at the step S26 or S28. The value of "subtracted synchronization information" is obtained as a result of subtraction of 39h from the value of the synchronization information, and if the value of the synchronization information is −128 (step S26), the value of the subtracted synchronization information is 47h, which is the same value as the synchronization byte.

Then, at the next step S30, the synchronization-information-processing unit 33 adds 3,240,000 to the clock Ns reference value (count value N1) to give a new clock Ns reference value and adds the phase-difference information found at the step S27 to the offset value O to result in a new offset value O, storing the new clock Ns reference value and the new offset value O in the memory 34 to replace the clock Ns reference value and the offset value O, which were stored in the memory 34 previously. That is, the clock Ns reference value and the offset value O are updated.

The synchronization-information-processing unit 33 also substitutes the updated clock Ns reference value and the updated offset value O into Eq. (1) for the previous clock Ns reference value and the previous offset value O respectively to compute a clock Se reference value. The synchronization-information-processing unit 33 then resets the count value of the counter 33B with a timing of the count value of the counter 33A becoming equal to the computed clock Se reference value.

Then, the flow of the program goes back to the step S24 to again carry out the processing of this step and the subsequent steps.

The transmission apparatus 21 (FIG. 8) has been explained so far. Next, the reception apparatus 22 is described.

FIG. 16 shows a typical configuration of the reception apparatus 22. An ATM/MPEG conversion unit 71 converts ATM cells transmitted through the networks 4-1 and 4-2 into a transport stream and outputs the stream to an adaptive clock unit 73.

The ATM/MPEG conversion unit 71 also generates a 8-KHz clock signal synchronous with a network clock signal of the network 4-2 on the basis of the received ATM cells, and outputs the 8-KHz clock signal to a PLL circuit 72. The PLL circuit 72 has a configuration identical with that of the PLL circuit 36 shown in FIG. 9 (The PLL circuit 72 includes a phase comparison circuit). Thus, the detailed explanation is not repeated. The PLL circuit 72 generates a 27-MHz clock signal (clock signal Nr) synchronous with the network clock signal of the network 4-2, and outputs the 27-MHz clock signal to a PCR renewal unit 76.

The adaptive clock unit 73 has a configuration shown in FIG. 17.

Data generated by the ATM/MPEG conversion unit 71 (including delay fluctuations introduced in the course of the transmission) is supplied to a FIFO unit 91 employed in the adaptive clock unit 73. The FIFO unit 91 temporarily holds the input data and then reads out the data in accordance with a read clock signal received from a control unit 92, outputting the data to a synchronization unit 74. In addition, the FIFO unit 91 also outputs a data occupation rate of its own to an LPF 93. The LPF 93 multiplies the data occupation rate of the FIFO unit 91 by a value according to a response characteristic (smoothes the data occupation rate of the FIFO unit 91), and outputs a product obtained as a result of the multiplication to the control unit 92.

The control unit 92 controls the speed of the read clock signal output to the FIFO unit 91 so that the data supplied by the LPF 93 becomes equal to a predetermined value.

Referring back to FIG. 16, much like the synchronization unit 31 employed in the transmission apparatus 21, the synchronization unit 74 establishes packet synchronization of the transport stream input by the adaptive clock unit 73, and passes on the transport stream to a PCR-packet detection unit 75.

The PCR-packet detection unit 75 detects a PCR packet among synchronous transport packets input by the synchronization unit 74 by formation of a judgment as to whether or not data peculiar to a PCR packet is set in the PCR packet's header portion and adaptation field portion, which are shown in FIG. 2, outputting a signal along with the transport stream to the PCR renewal unit 76. The PCR-packet detection unit 75 also outputs the detected PCR packet to a PCR comparison unit 81.

The transport stream and the PCR-packet detection signal are input to the PCR renewal unit 76 from the PCR-packet detection unit 75. Also, the clock signal Nr (27 MHz) synchronous with the network clock signal of the network 4-2 is input to the PCR renewal unit 76 from the PLL circuit 72.

The PCR renewal unit 76 has a counter 76A for counting the number of clock pulses Nr received from the PLL circuit 72 for each 24-hour time unit and a counter 76B for counting the number of clock pulses Nr for each predetermined time unit (typically 0.12 second). To put it in detail, the counter 76A resets its count value when it has counted the number of clock pulses Nr for the 24-hour time unit, and the counter 76B resets its count value when it has counted the number of clock pulses Ns (3,240,000 (=27,000,000×0.12) clock) for the predetermined time unit (typically 0.12 second).

As will be described later, the PCR renewal unit 76 computes a PCR value W for eliminating delay fluctuations introduced in the course of a transmission through the network 4-1 on the basis of the phase-difference information recorded in the PCR packet as synchronization information, the count value of the counter 76A and the count value of the counter 76B. The PCR renewal unit 76 then renews a PCR value E presently recorded in the PCR packet with the PCR value W.

A memory 77 is used for storing data supplied from the PCR renewal unit 76 and required for computation of the PCR value W. Since the PCR renewal unit 76 carries out the PCR-renewing process for each PID (for example, for each program), the memory 77 is also used for storing data supplied from by the PCR renewal unit 76 for each PID.

The transport stream including PCR packets each having a PCR value E replaced by PCR renewal unit 76 with a PCR value W is output to a PCR-packet detection unit 78 and a switch 84.

The PCR-packet detection unit 78 detects a PCR packet included in the transport stream input by the PCR renewal unit 76 and outputs a PCR-packet detection signal indicating the detection of the PCR packet to a PCR renewal unit 79 along with the transport stream.

The PCR renewal unit 79 has a counter 79A for counting the number of 27-MHz clock pulses from a VCXO 83 for each 24-hour time unit.

The PCR renewal unit 79 computes a new PCR value X on the basis of the PCR value W received from the PCR-packet detection unit 78, a comparison value (comparison value of the PCR value E with the PCR value X) received from a PCR comparison unit 81 through an LPF 82 and a count value R output by the counter 79A. The PCR renewal unit 76 then renews a PCR value W presently recorded in the PCR packet with the new PCR value X.

The PCR renewal unit 79 outputs a PCR packet whose PCR value W has been replaced by the PCR value X to the PCR comparison unit 81 and outputs the transport stream including PCR packets each including the PCR value X to a switch 84.

A memory 80 is used for properly storing data (gradient L, offset O, count value R and so forth, which will be described later) supplied by the PCR renewal unit 79 and required for computation of the PCR value X. Since the PCR renewal unit 79 carries out the PCR-renewal processing for each PID (for example, for each program), the memory 80 is also used for storing data supplied from the PCR renewal unit 79 for each PID.

The PCR comparison unit 81 compares the packet value E of a PCR packet received from the PCR-packet detection unit 75 with the packet value X of the same PCR packet received from the PCR renewal unit 79, and outputs a comparison value to the LPF 82 as shown in FIG. 18.

The LPF 82 multiplies the comparison value received from the PCR comparison unit 81 by a response characteristic of a predetermined value α (described later), and outputs a product obtained as a result of the multiplication to the PCR renewal unit 79.

A VCXO 83 (reference clock signal) outputs a 27-MHz clock signal to the PCR renewal unit 79. In the case of this example, the VCXO 83 is locked by using a PLL technique to a house synchronization (reference signal) in the broadcasting station, generating a clock signal with the same degree of precision as an atomic oscillator.

The switch 84 properly selects either the transport stream (including PCR packets each having the PCR value W) received from the PCR renewal unit 76 or the transport stream received from the PCR renewal unit 79 (including PCR packets each having the PCR value X). The switch 84 passes on the selected transport stream to a set top box 6 (FIG. 8).

Next, the operation of the PCR renewal unit 76 of the reception apparatus 22 is explained by referring to a flowchart shown in FIG. 19. It is to be noted that, in the following description, the PCR-renewal processing for only one PID is explained. In actuality, however, the same processing is carried out for each PID.

The flowchart begins with a step S41 at which, with the packet synchronization of the transport stream established, the PCR renewal unit 76 determines an offset value O. Details of the processing to determine an offset value O are explained by referring to a flowchart shown in FIG. 20.

At the step S61, when a first PCR packet (referred to hereafter as a reference PCR packet) is detected after establishment of packet synchronization, the flow of the program goes on to a step S62 at which the PCR renewal unit 76 sets the value of a counter "j" at an initial value of 1.

Then, at the next step S63, the PCR renewal unit 76 takes a count value, which is contained in the counter 76A when the reference PCR packet is detected, as a tentative clock Nr reference value. In addition, the PCR renewal unit 76 acquires a PCR value E of the reference PCR packet and uses the PCR value E as a tentative clock Se reference value.

Furthermore, the PCR renewal unit 76 uses the tentative clock Nr reference value and the tentative clock Se reference value for finding a tentative offset value O in accordance with equation (1) as follows:

Tentative clock $Se$ reference value=Tentative clock $Nr$ reference value+Tentative offset O Subsequently, at the next step S64, the PCR renewal unit 76 enters a state of waiting for the next PCR packet to be detected. As the next PCR packet is detected, the flow of the program goes on to a step S65 at which the PCR renewal unit 76 computes a difference ΔE in accordance with the following equation based on the PCR value E of the next PCR packet and a count value, which is contained in the counter 76A when the next PCR packet is detected as follows:

ΔE=PCR value E−(Tentative clock Se reference value+(Count value of counter 76A−Tentative clock Nr reference value))

In FIG. 21, a PCR packet (black dot in the figure) is shown in a 2-dimensional space based on the time when the PCR packet is detected and the PCR value E of the PCR packet. Notation ΔE denotes a difference between the PCR value E of a PCR packet detected at a particular time and a PCR value represented by a point on a straight line for the particular time. The straight line (which passes through the reference PCR packet) is a line representing a relation between the PCR value containing no delay and the detection time of the PCR packet.

Then, at the next step S66, the PCR renewal unit 76 forms a judgment as to whether or not the difference ΔE is greater than a predetermined limit value L. If the difference ΔE is determined to be not greater than the predetermined limit value L, the flow of the program goes on to a step S67 at which the difference ΔE is stored in the memory 77.

Subsequently, at the next step S68, the PCR renewal unit 76 forms a judgment as to whether or not the count value of the counter "j" has become equal to a predetermined value (7 in this case). If the outcome of the judgment indicates that the value of the counter "j" has not become equal to 7, the flow of the program goes on to a step S69 at which the value of the counter "j" is incremented by 1

If the outcome of the judgment formed at the step S66 indicates that the difference ΔE is greater than the predetermined limit value L, or if the value of the counter "j" is incremented by 1 at the step S69, on the other hand, the flow of the program goes back to the step S64 to again carry out the processing of this step and the subsequent steps.

If the outcome of the judgment formed at the step S68 indicates that the value of the counter "j" has become equal to 7, that is, seven differences ΔE1 to ΔE7 have been computed and stored in the memory 77, on the other hand, the flow of the program goes on to a step S70 at which the PCR renewal unit 76 computes an average value of the differences ΔE1 to ΔE7 in accordance with the following equation and stores the average value in the memory 77:

ΔE average value=(ΔE1+ΔE2+ΔE3+ΔE4+ΔE5+ΔE6+ ΔE7)/7

Then, at the next step S71, the PCR renewal unit 76 adds the ΔE average value to the tentative offset value ○ found at the step S63 in accordance with an equation given below to give an offset value ○. The addition of the ΔE average value to the tentative offset value ○ shifts a line representing the tentative offset value ○ in the upward direction by a distance represented by the ΔE average value without changing the orientation of the line as shown in FIG. 21.

Offset value ○=Tentative offset value ○+ΔE average value

After the offset value ○ is computed as described above, the processing is ended and the flow of the program goes on to a step S42 of the flowchart shown in FIG. 19.

At the step S42, a first PCR packet whose PCR is to be renewed is detected. Then, at the next step S43, the PCR renewal unit 76 takes the current count value of the counter 76A as the clock Nr reference value.

To put it concretely, assume for example that a PCR packet K11 is detected as a first PCR packet as shown in FIG. 23A. In this case, a count value N11, which is contained in the counter 76A when the PCR packet K11 is detected, is used as the clock Nr reference value.

At that time, the PCR renewal unit 76 uses the PCR value E11 of the first PCR packet K11 as the clock Se reference value shown in FIG. 23B and the PCR renewal unit 76 resets, as shown in FIG. 23C, the count value of the counter 76B with a timing, shown in FIG. 23A, of the count value of the counter 76A becoming equal to the clock Se reference value.

Then, at the next step S44, the PCR renewal unit 76 stores the clock Nr reference value and the offset value ○ in the memory 77 by associating the clock Nr reference value and the offset value ○ with the PID of a program being processed.

Subsequently, at the next step S45, the PCR renewal unit 76 forms a judgment as to whether or not the PCR packet detected at the step S42 is a PCR packet detected before the count value of the counter 76B becomes equal to 3,240,000. As described above, the count value of the counter 76B has been reset with a timing of the count value of the counter 76A becoming equal to the clock Se reference value. If the outcome of the judgment indicates that the PCR packet has been detected before the count value of the counter 76B becomes equal to 3,240,000, the flow of the program goes on to a step S46.

In the case of the example shown in FIG. 23, in a period before the count value of the counter 76B, which has been reset with a timing of the count value of the counter 76A becoming equal to the clock Se reference value, becomes equal to 3,240,000, a PCR packet K12 is detected. Thus, the flow of the program goes on to the step S46. The clock Se reference value is the PCR value E11.

At the step S46, the PCR renewal unit 76 computes a new PCR value W to be used as an update of the PCR value E of the PCR packet detected at the step S45. It is to be noted that, in the following description, the PCR packet whose PCR value E is replaced by the computed PCR value W is referred to as an object PCR packet.

The following description explains concretely a case in which the object PCR packet is the PCR packet K12. In this case, the PCR renewal unit 76 acquires a count value N12, which is contained in the counter 76A when the PCR packet K12 is detected.

The PCR renewal unit 76 computes a corrected value by substituting the count value N12 for the PCR value of the clock signal Nr in the following equation:

Correction value=(Phase-difference information ×(PCR value of clock signal Nr−Clock Nr Reference Value))÷3,240,000)

That is to say, the correction value is a difference in phase between a system clock pulse Se and a clock pulse Nr generated over a period of time during which the count value of the clock signal Nr changes from a reference value of the clock signal Nr to a PCR value (count value N12) of the clock signal Nr. This difference in phase is calculated on the basis of the phase-difference information (difference in phase between a system clock pulse Se and a clock pulse Ns generated over a period of time before the counted number of clock pulses Ns synchronous with the network clock signal of the network 4-1 reaches 3,240,000) between a system clock pulse Se on the encoding side and a clock pulse Ns.

In accordance with the following equation, the PCR renewal unit 76 adds the offset value ○ and the correction value to the count value N12 representing the PCR value of the clock signal Nr to find a new PCR value W of the PCR packet K12 (FIG. 23B).

*PCR value W=PCR value of the clock signal Nr+Offset value ○+Correction value*

Then, at a step S47, the PCR renewal unit 76 replaces the PCR value E of the object PCR packet with the PCR value W computed at the step S46.

After the PCR renewal unit 76 replaces the PCR value E with the PCR value W at the step S47 or, if the outcome of the judgment formed at the step S45 indicates that the PCR packet is not a packet that has been detected before the count value of the counter 76B becomes equal to 3,240,000, the flow of the program goes on to a step S48. At the step S48, the PCR renewal unit 76 stores the new clock Nr reference value obtained as a result of addition of 3,240,000 to the clock Nr reference value and the new offset value ○ obtained as a result of addition of the phase-difference information used at the step S46 to the previous offset value ○ in the memory 77 to replace respectively the clock Nr reference value and the offset value ○, which were stored in the memory 77 previously. That is, the clock Nr reference value and the offset value ○ are updated.

The PCR renewal unit 76 computes a clock Se reference value by substituting the updated clock Nr reference value and the updated offset value ○ into an equation given below for respectively the clock Nr reference value and the offset value ○. Then, the PCR renewal unit 76 resets the count value of the counter 76B with a timing of the count value of the counter 76A becoming equal to the computed clock Se reference value.

*Clock Se reference value=Clock Nr reference value+ Offset value ○*

Then, the flow of the program goes back to the step S45 to again carry out the processing of this step and the subsequent steps.

As described above, the PCR value E is replaced by the PCR value W.

Next, the operation of the PCR renewal unit 79 is explained by referring to a flowchart shown in FIG. 24.

At the step S81, the PCR renewal unit 79 finds a gradient L in accordance with Eq. (2) based on PCR values W1 to W8 of "n" (in this case, "n"=8) successive PCR packets K1 to K8 detected by the PCR-packet detection unit 78 and count values R1 to R8 which are contained in the counter 79A when the PCR packets K1 to K8 are detected respectively.

[Eq. 1]   (2)

$$\text{Gradient } L = [\sum_{i}^{n} [\{PCR \text{ value } Wi+1 - PCR \text{ value } Wi\}/ \{\text{Count value } Ri+1 - \text{Count value } Ri\}]]/n$$

For example, in an example shown in FIG. 25 wherein the vertical axis represents the PCR value and the horizontal axis represents the count value R, the gradient L is an average value of gradients of straight lines, relative to the horizontal axis, connecting a PCR packet Ki to a PCR packet Ki+1. In other words, the gradient L represents an average of the PCR value's shifts, generated over a period of time during which the count value of the VCXO 83 changes from a count value Ri to a count value Ri+1, relative to the clock signal generated by the VCXO 83.

It is to be noted that, since the PCR value W is a PCR value whose jitters added in the course of the transmission through the network 4-1 are dejittered, the loci through the PCR packet K1 to the PCR packet K8 are not much separated away from a straight line emanating from the origin and representing loci through PCR packets each having an unshifted PCR value as shown in FIG. 25. Since the PCR values W each include a shift caused by the jitters added in the course of the transmission through the network 4-2, however, variations reflecting the shifts exist.

Then, at the next step S82, the PCR renewal unit 79 finds an offset value ○ by using a straight line having the gradient L and using PCR values W1 of "n" (=8) successive PCR packets Ki ("i"=9, 10 . . . 16) detected by the PCR-packet detection unit 78. To put it concretely, the PCR renewal unit 79 finds an offset value ○ in accordance with Eq. (3) as follows:

[Eq. 2]   (3)

$$\text{Offset value } o = \{\sum_{i}^{n} (\text{Value } Di - PCR \text{ value } Wi\}/n$$

In the equation, value Di denotes the vertical-axis coordinate of a PCR packet Ki on a straight line having the gradient L and passing through the PCR packet K9 as shown in FIG. 26. The PCR packet Ki has a horizontal-axis coordinate equal to a count value Ri, which is contained in the counter 79A when the PCR packet Ki is detected.

That is, the offset value ○ is an average value of differences (value D9–PCR value W9), (value D10–PCR value W10), (value D11–PCR value W11), (value D12–PCR value W12), (value D13–PCR value W13), (value D14–PCR value W14), (value D15–PCR value W15) and (value D16–PCR value W16), which are each indicated in the figure by a vertical arrow in the upward direction.

Then, at the next step S83, the PCR renewal unit 79 finds a correction value "i" in accordance with the following equation:

*Correction value "i"=Output of LPF 82 at detection of PCR packet Ki-1 (=Comparison value of PCR value Ei-1 with PCR value Xi-1 (FIG. 18)×α)×(Count value Ri–Count value Ri-1)*

Subsequently, at the next step S84, the PCR renewal unit 79 computes a PCR value Xi to be used as a replacement of the PCR value Wi of the PCR packet Ki ("i"=17, 18 . . . ) in accordance with an equation given below.

*PCR value Xi=Gradient L×(Count value Ri–Count value Ri-1)+PCR value Wi+Offset value ○+Correction value "i"*

In the case of the PCR value X excluding the additional correction value "i" (referred to hereafter as a PCR value X'), no shift relative to the clock signal of the VCXO 83 is generated during a short period of time. This is because a shift, generated over a period of time till a PCR packet Ki is input, between the clock signal of the VCXO 83 and the PCR value W has been removed. To be more specific, for example, PCR packets into which PCR values X'17 to X'24 are written can each be represented by a black triangular symbol on a locus shown as a straight line in FIG. 27 of PCR packets each having no PCR-value shift.

On the other hand, between the network clock signals of the networks 4-1 and 4-2 connecting the transmission apparatus 21 to the reception apparatus 22, however, a frequency error 1E-11 (difference in phase) is allowed. Thus, as time elapses, the PCR values X'17 to X'24 are separated from the original locus passing through white triangular symbols as shown in FIG. 28. As a result, it is quite within the bounds of possibility that a buffer (not shown) fails. Black triangular symbols shown in FIG. 28 represent PCR packets having PCR values X'n and the subsequent PCR values.

To solve this problem, in the present invention, a coefficient based on a result of comparison of the PCR value E with the PCR value X is used as a correction value and the PCR value X' (PCR value with a shift, generated over a period of time till a PCR packet Ki is input, between the clock signal of the VCXO 83 and the PCR value W removed) is added. Thus, the frequency error between the two networks can be corrected. The white triangle symbols shown in FIG. 28 represent PCR packets Kn to Kn+7 containing PCR values Xn to Xn+7 respectively.

The value $\alpha$ is in the range 2.00E-11 (=(1+1E-11)/(1-1E-11)) and 2.78E-9 (=0.0075/27). The value 2.00E-11 is a possible maximum shift per clock between the network clock signals of the networks 4-1 and 4-2. The value 2.78E-9 is a shift per clock for a frequency rate of 0.0075 Hz/s as prescribed by the MPEG specifications (H.222.0).

Then, at the next step S85, the PCR renewal unit 79 replaces the PCR value Wi of the PCR packet with the PCR value Xi computed at the step S84.

The PCR renewal unit 79 outputs the transport stream including PCR packets each having a PCR value W thereof replaced with a PCR value X to the switch 84. The switch 84 selects a transport stream output by the PCR renewal unit 76 while a gradient L is being computed at the step S81 (in the example described above, while a transport stream including PCR packets K1 to K8 is being received), and while an offset value $\bigcirc$ is being computed at the step S82 (in the example described above, while a transport stream including PCR packets K9 to K17 is being received). After the PCR renewal unit 79 actually replaces the PCR values W with the PCR values X (in the example described above, while a transport stream including PCR packets following the PCR packet K17 is being received), however, the switch 84 selects a transport stream output by the PCR renewal unit 79.

Then, at the next step S86, the PCR renewal unit 79 computes a gradient L in accordance with an equation given below, and uses the computed gradient L as a new gradient L:

New gradient $L=(PCR$ value $Xi-PCR$ value $Wi-1)/$ (Count value $Ri$-Count value $Ri-1$)

The PCR renewal unit 79 stores the newly computed gradient L in the memory 80 to replace the previously stored gradient L and updates the gradient L.

Subsequently, at the next step S87, the PCR renewal unit 79 computes a new offset value $\bigcirc$. To put it concretely, first of all, a correction value i+1 is computed in accordance with the following equation:

Correction value $i+1$=Output of $LPF$ 82 at detection of $PCR$ packet $Ki$ (=Comparison value of $PCR$ value $Ei$ with $PCR$ value $Xi$)×α)×(Count value $Ri+1$−Count value $Ri$)

Then, the PCR renewal unit 79 computes a new offset value $\bigcirc$ in accordance with the following equation:

Correction value $i+1$=Offset value $\bigcirc$+Correction value "$i$"

The PCR renewal unit 79 stores the newly computed offset value $\bigcirc$ in the memory 80 to replace the previously stored offset value $\bigcirc$ and updates the offset value $\bigcirc$.

Then, the flow of the program goes back to the step S83 to again carry out the processing of this step and the subsequent steps ("i" is incremented by 1 before the same processing is repeated).

In the case of this example, an offset value $\bigcirc$ is computed on the basis of a computed gradient L as described above. It is to be noted that, as an alternative, an offset value $\bigcirc$ can also be computed directly without using a gradient L. In the case of this alternative, however, a storage area is required for storing a PCR value W and a count value R for each packet. Thus, the scale of the hardware increases. That is, by computing an offset value $\bigcirc$ on the basis of a computed gradient L as is the case with this example, the size of the hardware can be reduced.

FIG. 29 shows another typical configuration of the reception apparatus 22 provided by the present invention. A PCR packet containing a PCR value E from the PCR-packet detection unit 75 and a PCR packet containing a PCR value W from the PCR-packet detection unit 78 are input to the PCR comparison unit 81 employed in this apparatus 22. The PCR comparison unit 81 compares the PCR value E with the PCR value W and outputs a comparison value according to a result of the comparison to the LPF 82 shown in FIG. 30.

Since the other components are the same as their counterparts employed in the reception apparatus 22 shown in FIG. 16, their explanation is omitted.

The operation of the PCR renewal unit 79 employed in this embodiment is explained by referring to a flowchart shown in FIG. 31.

Since the processing carried out at steps S91 and S92 is the same as that of the steps S81 and S82 of the flowchart shown in FIG. 24, its explanation is omitted.

Then, at the next step S93, the PCR renewal unit 79 finds a correction value "i" in accordance with the following equation:

Correction value "$i$"=Output of $LPF$ 82 at detection of $PCR$ packet $Ki$×(=Comparison value of $PCR$ value $Ei-1$ with $PCR$ value $Wi-1$)×α)×(Count value $Ri$−Count value $Ri-1$))

In the case of this example, the PCR comparison unit 81 compares the PCR value Ei with the PCR value Wi (PCR comparison unit 81 compares the PCR value E with the PCR value X in the reception apparatus 22 shown in FIG. 16). Thus, a product of $\alpha$ and a comparison value (FIG. 30) representing a result of the comparison is output to the LPF 82. It is to be noted that notation α denotes the same quantity as that used in the reception apparatus 22 shown in FIG. 16.

Then, at the next step S94, in accordance with an equation given below, the PCR renewal unit 79 computes a PCR value Xi to be used as a replacement of the PCR value Wi of the PCR packet Ki ("i"=17, 18 . . . ).

PCR value $Xi$=Gradient $L$×(Count value $Ri$−Count value $Ri-1$)+$PCR$ value $Wi$+Offset value $\bigcirc$+Correction value "$i$" (correction value found at the step $S93$)

Subsequently, at the next step S95, the PCR renewal unit 79 replaces the PCR value Wi of the PCR packet with the PCR value Xi found at the step S94.

Then, at the next step S96, the PCR renewal unit 79 computes a gradient L in accordance with an equation given below, and uses the computed gradient L as a new gradient L:

New gradient $L=(PCR$ value $Xi-PCR$ value $Wi-1)/$
(Count value $Ri$–Count value $Ri-1$)

The PCR renewal unit 79 stores the newly computed gradient L in the memory 80 to replace the previously stored gradient L and updates the gradient L.

Subsequently, at the next step S97, the PCR renewal unit 79 computes a new offset value ○. To put it concretely, first of all, a correction value i+1 is computed in accordance with the following equation:

Correction value $i+1$=Output of $LPF$ 82 at detection of $PCR$ packet $Ki+1$ (=Comparison value of $PCR$ value $Wi+1$ with $PCR$ value $Ei+1\times\alpha)\times$ (Count value $Ri+1$–Count value $Ri$)

Then, the PCR renewal unit 79 computes a new offset value ○ in accordance with the following equation:

Correction value $i+1$=Offset value ○+Correction value "$i$"

The PCR renewal unit 79 stores the newly computed offset value ○ in the memory 80 to replace the previously stored offset value ○ and updates the offset value ○.

Then, the flow of the program goes back to the step S93 to again carry out the processing of this step and the subsequent steps.

FIG. 32 shows another typical configuration of the reception apparatus 22. The reception apparatus employs components ranging from the PCR renewal unit 101 to the PCR comparison unit 103 as substitutes for the components ranging from the PCR renewal unit 79 to the LPF 82, which are employed in the reception apparatus 22 shown in FIG. 16.

The PCR-packet detection unit 78 detects a PCR packet (PCR value W) from a transport stream output by the PCR renewal unit 76, and outputs a PCR-packet detection signal which indicates that a PCR packet has been detected to the PCR renewal unit 101 along with the input transport stream. The PCR-packet detection unit 78 also outputs the detected PCR packet (PCR value W) to the PCR comparison unit 103.

The PCR renewal unit 101 has a counter 101A for counting the number of 27-MHz clock pulses received from the VCXO 83 for each 24-hour time unit.

On the basis of a comparison value between the PCR value W of a PCR packet output by the PCR-packet detection unit 78 and a PCR value Y computed previously, and a count value R which is contained in the counter 101A when the PCR packet is detected, the PCR renewal unit 101 computes a new PCR value Y used as a replacement of the existing PCR value.

On the basis of an input received from the PCR comparison unit 103 (comparison value of the PCR value W with the PCR value Y), the PCR renewal unit 101 corrects an offset value ○ required in the computation of a PCR value Y.

The PCR renewal unit 101 outputs the PCR packet having its PCR value replaced by the computed PCR value Y to the PCR comparison unit 103 and outputs a transport stream including the PCR packet having its PCR value replaced by the computed PCR value Y to the switch 84.

A memory 102 is used for properly storing data supplied from the PCR renewal unit 101 and required for computation of the PCR value Y (gradient L, offset value ○ and count value R) Since the PCR renewal unit 101 carries out the PCR-renewing process for each PID (for example, for each program), the memory 102 is also used for storing data generated by the PCR renewal unit 101 for each PID.

The PCR comparison unit 103 compares the PCR value W of a PCR packet output by the PCR-packet detection unit 78 with the PCR value Y of a PCR packet output by the PCR renewal unit 101, and outputs a comparison value, which represents a result of the comparison as shown in FIG. 33, to the PCR renewal unit 101.

The operation of the PCR renewal unit 101 is explained by referring to a flowchart shown in FIG. 34.

At the step S101, the PCR renewal unit 101 finds a gradient L in accordance with Eq. (2) based on PCR values W1 to W8 of "n" (in this case, "n"=8) successive PCR packets K1 to K8 detected by the PCR-packet detection unit 78 and count values R1 to R8 of the counter 101A. The count values R1 to R8 are count values, which are contained in the counter 101A when the PCR packets K1 to K8 are detected respectively. The processing carried out at this step corresponds to the processing carried out by the PCR renewal unit 79 at the step S81 (FIG. 23).

Then, at the next step S102, the PCR renewal unit 101 finds an offset value ○ in accordance with Eq. (3) by using a straight line having the gradient L and using PCR values Wi of "n" (=8) successive PCR packets Ki ("i"=9, 10 . . . 16) detected by the PCR-packet detection unit 78. The processing carried out at this step corresponds to the processing carried out by the PCR renewal unit 79 at the step S82.

Then, at the next step S103, the PCR renewal unit 101 finds a correction value "i". To put it concretely, first of all, the PCR renewal unit 101 acquires a correction value representing a result of comparison of a PCR value Yi−1 found earlier with a PCR value Wi−1 as shown in FIG. 33.

Then, the PCR renewal unit 101 computes a correction value "i" in accordance with the following equation:

Correction value "$i$"=Comparison value of $PCR$ value $Yi-1$ with $PCR$ value $Wi-1\times\alpha\times$(Count value $Ri$–Count value $Ri-1$)

Subsequently, at the next step S104, the PCR renewal unit 101 computes a PCR value Yi to be used as a replacement of the PCR value Wi of the PCR packet Ki ("i"=17, 18 . . . ) in accordance with an equation given below.

$PCR$ value $Yi$=Gradient $L\times$(Count value $Ri$–Count value $Ri-1)+PCR$ value $Wi+$Offset value ○+Correction value "$i$" (found at the step S103)

Then, at the next step S105, the PCR renewal unit 101 replaces the PCR value Wi of the PCR packet with the PCR value Yi computed at the step S104.

Then, at the next step S106, the PCR renewal unit 101 computes a gradient L in accordance with an equation given below, and uses the computed gradient L as a new gradient L:

New gradient $L=(PCR$ value $Yi-PCR$ value $Wi-1)/$
(Count value $Ri$–Count value $Ri-1$)

The PCR renewal unit 101 stores the newly computed gradient L in the memory 102 to replace the previously stored gradient L and updates the gradient L.

Subsequently, at the next step S107, the PCR renewal unit 101 computes a new offset value ○. To put it concretely, first of all, a correction value i+1 is computed in accordance with the following equation:

Correction value $i+1$=Comparison value of $PCR$ value $Yi$ with $PCR$ value $Wi\times\alpha\times$(Count value $Ri+1$–Count value $Ri$)

Then, the PCR renewal unit 101 computes a tentative offset value ○ in accordance with the following equation:

Correction value $i+1$=Tentative offset value ○+Correction value "$i$"

Finally, the PCR renewal unit 101 adds a comparison value received from the PCR comparison unit 103 (FIG. 33) to the computed tentative offset value ○ and uses the sum obtained as a result of the addition as a new offset value ○.

The PCR renewal unit 101 stores the newly computed offset value ○ in the memory 102 to replace the previously stored offset value ○ and updates the offset value ○.

Since the offset value ○ is corrected on the basis of a result of comparison of the PCR value Y with the PCR value W as described above, if a difference between the PCR value Y and the PCR value W is at least equal to 1, a PCR value Y is computed next so that a difference between the PCR value Y computed next and the PCR value W will be smaller than 1.

FIG. 35 is a diagram showing PCR packets K17 to 24 including PCR values W17 to W24 respectively and PCR packets K17 to 24 including PCR values Y17 to Y24 respectively. In the case of this example, the difference between the PCR values W19 and Y19 for a count value R19 is at least equal to 1. Thus, the PCR renewal unit 101 finds a PCR value Y20 smaller than a value computed as a PCR value Y with the offset value ○ uncorrected by a difference of 1 as shown by a symbol X in the figure.

Then, the flow of the program goes back to the step S103 to again carry out the processing of this step and the subsequent steps.

In the case of this example, a comparison result produced by the PCR comparison unit 103 is supplied to the PCR renewal unit 101, which corrects a computed offset ○. It is to be noted that, as an alternative, the comparison result produced by the PCR comparison unit 103 can also be supplied to the PCR renewal unit 76, which then corrects a computed offset ○.

FIG. 36 shows a further typical configuration of the reception apparatus 22 provided by the present invention.

The reception apparatus 22 shown in this figure is obtained by adding the PCR renewal unit 101 and the PCR comparison unit 103, which are employed in the reception apparatus 22 shown in FIG. 32, to the reception apparatus 22 shown in FIG. 29. That is, the reception apparatus 22 shown in FIG. 37 is a combination of the reception apparatus 22 shown in FIG. 32 and the reception apparatus 22 shown in FIG. 29.

The switch 84 selects either a transport stream output by the PCR renewal unit 76 or a transport stream output by the PCR renewal unit 79.

Much like the reception apparatus 22 shown in FIG. 29, the PCR renewal unit 79 computes a new PCR value X and uses the computed value for renewing the existing PCR value. The computation of a new PCR value X is based on the PCR value W of a PCR packet received from the PCR-packet detection unit 78, a comparison value received from the PCR comparison unit 81 through the LPF 82 (comparison value of a PCR value E with a PCR value W) and a count value of the counter 79A.

In the case of this example, the PCR renewal unit 79 outputs a PCR packet with its PCR value replaced by the computed PCR value X to the PCR comparison unit 103, and supplies a transport stream including PCR packets each having its PCR value replaced by a computed PCR value X to the switch 84.

The PCR comparison unit 103 compares the PCR value X of a PCR packet output by the PCR renewal unit 79 with the PCR value Y of a PCR packet output by the PCR renewal unit 101, and outputs a comparison value, which represents a result of the comparison as shown in FIG. 37, to the PCR renewal unit 101 and also to the PCR renewal unit 76.

In the operation to update the offset value ○ (step S30 in FIG. 13), the PCR renewal unit 76 adds the phase-difference information computed at the step S27 and a comparison value output by the PCR comparison unit 103 to the offset value ○, using the sum obtained as a result of the addition as a new offset value ○. The PCR renewal unit 76 then stores the new offset value ○ in the memory 77 in the same way as the previous apparatus 22.

The foregoing is the description of the reception apparatus 22 shown in FIG. 8.

Figure 1:
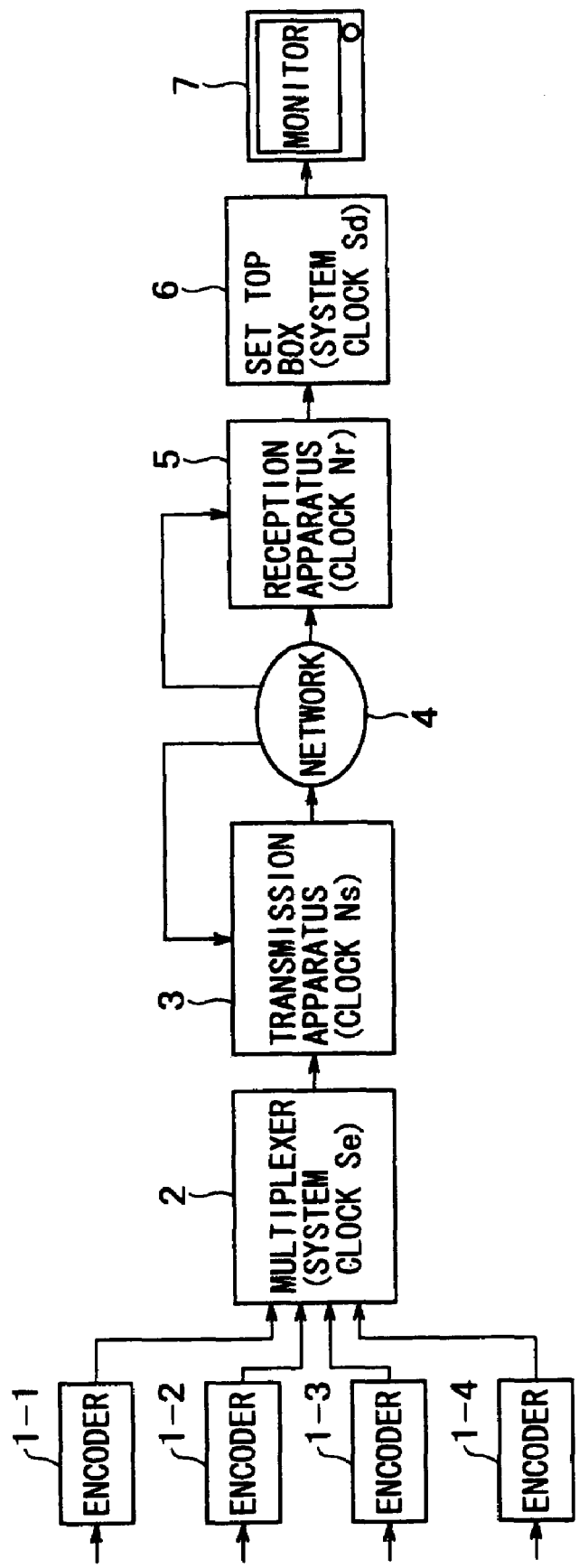
FIG. 1 is a block diagram showing a typical configuration of the conventional data transmission system.

FIG. 38 shows another typical configuration of a data transmission system provided by the present invention. This data transmission system employs a multiplexer 201 as a substitute for the multiplexer 2 employed in the data transmission system shown in FIG. 1. The remaining components are identical with those employed in the data transmission system shown in FIG. 1.

FIG. 39 shows a typical configuration of components employed in the multiplexer 201, which are relevant to the present invention.

Four time-stamp addition units 211-1 to 211-4 (hereinafter, simply denoted as 211 when there is no need to distinguish them from each other) adds time stamps to PCR packets of packetized data output by encoders 1-1 to 1-4 respectively. A time stamp is a count value of clock pulses generated by the VCXO 217 corresponding to an input timing of a PCR packet (hereinafter referred to as reference clock signal). As shown in FIG. 40, a time stamp can be added at the beginning of a transport packet (PCR packet) or at the end of a PCR packet.

The time-stamp addition unit 211 outputs a transport stream including PCR packets each having an additional time stamp to a FIFO unit 212 provided for the time-stamp addition unit 211.

Four FIFO units 212-1 to 212-4 are used for temporarily storing transport streams each including PCR packets with an additional time stamp from the time-stamp addition units 211-1 to 211-4 respectively. The stored transport packets are read out and output to a PCR collection 214 by way of a switch 213 on a FIFO (First In First Out) basis according to the reference clock signal supplied to the switch 213.

The PCR collection unit 214 computes a PCR value V in accordance with an equation given below and stores the PCR value V in a PCR packet.

$$PCR\ value\ V = Time\ stamp + Count\ Value\ Rb - Count\ value\ Ra - Value\ M$$

In the above equation, the count value Ra is a count value R, which is equal to a counted number of reference clock pulses when the PCR packet arrives at the time-stamp addition unit 211. On the other hand, the count value Rb is a count value R, which is equal to a counted number of reference clock pulses when a multiplexing operation is ended (when the PCR packet arrives at the PCR collection unit 214). The value M is a pre-calculated number of reference clock pulses, which represents a time to complete a multiplexing process based on the operation of the switch 213.

That is, the expression (Count Value Rb−Count value Ra−Value M) is a difference in phase between the system clock signal Se and the clock signal in the multiplexing process (reference clock signal).

A PCR correction unit 215 computes a new PCR value Z to be used as a replacement of the PCR value V on the basis of the PCR value V of a PCR packet output by the PCR collection unit 214 and the count value R equal to a counted number of reference clock pulses generated by the VCXO 217.

The VCXO 217 is locked by using a PLL technique to a house synchronization (reference signal), for example, in the broadcasting station, generating a 27-MHz clock signal (reference clock signal) with the same degree of precision as an atomic oscillator.

Next, the operation of the PCR renewal unit 215 is explained by referring to a flowchart shown in FIG. 41.

At the step S111, the PCR renewal unit 215 finds a gradient L in accordance with an equation given below on the basis of PCR values V101 to V108 of "n" (in this case, "n"=8) successive PCR packets K101 to K108 output by the PCR collection unit 214 and count values R101 to R108 which are counted numbers of reference clock signals at times the PCR packets K101 to K108 are detected respectively.

[Eq. 3]

$$\text{Gradient } L = \left[\sum_{i}^{n} \left[\{PCR \text{ value } Vi+1 - PCR \text{ value } Vi\} / \{\text{Count value } Ri+1 - \text{Count value } Ri\}\right]\right] / n$$

For instance, in an example shown in FIG. 42 wherein the vertical axis represents the PCR value and the horizontal axis represents the count value R, the gradient L is an average value of gradients of straight lines, relative to the horizontal axis, connecting a PCR packet Ki to a PCR packet Ki+1. In other words, the gradient L represents an average of the PCR value's shifts relative to the reference clock signal generated over a period of time during which the count value representing a counted number of reference clock pulses changes from a count value Ri to a count value Ri+1.

It is to be noted that, since the PCR value V has been computed by using a time stamp, the loci through the PCR packet K101 to the PCR packet K108 are not much separated away from a straight line emanating from the origin and representing loci through PCR packets each having an unshifted PCR value as shown in FIG. 42.

Then, at the next step S112, the PCR renewal unit 215 finds an offset value O by using a straight line having the gradient L and using PCR values Vi of "n" (=8) successive PCR packets Ki ("i"=109, 110 . . . 116). To put it concretely, the PCR renewal unit 215 finds an offset value O in accordance with the following equation:

[Eq. 4]

$$\text{Offset value } o = \left\{\sum_{i}^{n} (\text{Value } Di - PCR \text{ value } Vi)\right\} / n$$

In the equation, value Di denotes the vertical-axis coordinate of a PCR packet Ki on a straight line having the gradient L and passing through the PCR packet K109 as shown in FIG. 43. The PCR packet Ki has a horizontal-axis coordinate equal to a count value Ri, which is a counted number of reference clock signals at a time the PCR packet Ki is detected.

That is, the offset value O is an average value of differences (value D109−PCR value V109), (value D110−PCR value V110), (value D111−PCR value V111), (value D112−PCR value V112), (value D113−PCR value V113), (value D114−PCR value V114), (value D115−PCR value V115) and (value D116−PCR value V116), which are each indicated in the figure by a vertical arrow in the upward direction.

Then, at the next step S113, first of all, the PCR renewal unit 215 forms a judgment as to whether or not the absolute value of a difference between the PCR value Vi−1 and the PCR value Zi−1 found earlier is greater than a predetermined value Lt. If the absolute value of the difference is not greater than the predetermined value Lt, the flow of the program goes on to a step S114.

At the step S114, the PCR renewal unit 215 finds a correction value "i" in accordance with the following equation:

Correction value "i"=Comparison value of PCR value Zi−1 with PCR value Vi−1×α×(Count value Ri−Count value Ri−1)

The comparison value is a value representing a result of comparison of a PCR value Z with a PCR value V shown in FIG. 44. The value α is a value not exceeding 2.78E-9 (=0.0075/27). The value 2.78E-9 is a shift per clock for a frequency rate of 0.0075 Hz/s as prescribed by the MPEG specifications (H.222.0).

Subsequently, at the next step S11S, the PCR renewal unit 215 computes a PCR value Zi to be used as a replacement of the PCR value Vi of the PCR packet Ki ("i"=117, 118 . . . ) in accordance with an equation given below.

PCR value Zi=Gradient L×(Count value Ri−Count value Ri−1)+PCR value Vi+Offset value O+Correction value "i" (correction value computed at the step S114)

Then, at the next step S116, the PCR renewal unit 215 replaces the PCR value Vi of the PCR packet with the PCR value Zi computed at the step S115.

The PCR renewal unit 215 outputs a transport stream including PCR packets each having its PCR value replaced by a PCR value Z to a switch 217.

Then, at the next step S117, the PCR renewal unit 215 computes a gradient L in accordance with an equation given below, and uses the computed gradient L as a new gradient L:

New gradient L=(PCR value Zi−PCR value Vi−1)/ (Count value Ri−Count value Ri−1)

The PCR renewal unit 215 stores the newly computed gradient L in a memory 216 to replace the previously stored gradient L and updates the gradient L.

Subsequently, at the next step S118, the PCR renewal unit 215 computes a new offset value O. To put it concretely, first of all, a correction value i+1 is computed in accordance with the following equation:

Correction value i+1=Comparison value of PCR value Zi with PCR value Vi×α×(Count value Ri+1−Count value Ri)

Then, the PCR renewal unit 215 computes a new offset value O in accordance with the following equation:

Correction value i+1=Offset value O+Correction value "i"

The PCR renewal unit 215 stores the newly computed offset value O in a memory 216 to replace the previously stored offset value O and updates the offset value O.

Then, the flow of the program goes back to the step S113 to again carry out the processing of this step and the subsequent steps.

FIG. 45 shows another typical configuration of the multiplexer 201. This configuration of the multiplexer 201 is obtained by adding a detection unit 221 and a memory 222 to the multiplexer 201 shown in FIG. 39.

The PCR value V may become discontinuous, for example, when the operation of an encoder 1 is restarted or linked to a previous operation. In this case, if the gradient L and the offset value O are updated at the steps S117 and S118 respectively of the flowchart shown in FIG. 41 on the basis of a PCR packet with a discontinuous PCR value V, a proper PCR value Z can no longer be obtained. To solve this problem, the detection unit 221 detects this discontinuity of the PCR value V and, if detected, the detection unit 221 informs the PCR renewal unit 215 that a discontinuity of the PCR value V has been detected.

Then, basically, when the PCR renewal unit 215 is informed by the detection unit 221 that a discontinuity of the PCR value V has been detected while the PCR renewal unit 215 is carrying out the processing represented by the flowchart shown in FIG. 41, the flow of the program goes back to the step S111 to repeat the processing beginning with computation of a gradient L.

The detection unit 221 has a counter 221A for counting the number of reference clock pulses for each 24-hour time unit and a counter 221B for counting the number of reference clock pulses for each predetermined time unit (typically 0.12 second).

The operation of the detection unit 221 is explained by referring to a flowchart shown in FIG. 46. It is to be noted that, in the following description, processing to detect a discontinuity of the PCR value for only one PID is explained. In actuality, however, the same processing is carried out for each PID.

At the step S131, a packet is input to the detection unit 221 from the PCR collection unit 214. Then, at the next step S132, a reference value A and an offset value O are computed.

As an example, the following description concretely explains a case in which a PCR packet Kn is input as shown in FIG. 47A. First of all, the detection unit 221 acquires a PCR value Vn of the PCR packet Kn and uses the PCR value Vn as a reference value B as shown in FIG. 47B.

As a reference value A, the detection unit 221 takes a count value Rn, which is contained in the counter 221A when the PCR packet Kn is detected. The detection unit 221 then computes an offset value O (FIG. 47A) from the reference values A and B in accordance with the following equation.

Reference value $B$=Reference value $A$+Offset value $O$

It is to be noted that, as shown in FIG. 47C, the detection unit 221 resets the count value R of the counter 221B with a timing of the count value R of the counter 221A becoming equal to the reference value B as shown in FIG. 47B.

Then, at the next step S133, the detection unit 221 stores the reference value A and the offset value O, which were computed at the step S132, in a memory 222 by associating the reference value A and the offset value O with the PID of the program being processed.

Subsequently, at the next step S134, the detection unit 221 enters a state of waiting for the next PCR packet to be detected. As the next PCR packet is detected, the flow of the program goes on to a step S135.

At the next step S135, the detection unit 221 forms a judgment as to whether or not the PCR packet detected at the step S134 is a PCR packet detected before the count value of the counter 221B becomes equal to 3,240,000. As described above, the count value of the counter 221B has been reset with a timing of the count value of the counter 221A becoming equal to the reference value B. If the outcome of the judgment indicates that the PCR packet has been detected before the count value of the counter 221B becomes equal to 3,240,000, the flow of the program goes back to the step S134.

In the example shown in FIG. 47, the next PCR packet Kn+1 is a PCR packet detected before the count value of the counter 221B, which has been reset with a timing of the count value of the counter 221A becoming equal to the reference value B (the same value as the PCR value Vn), becomes equal to 3,240,000. Thus, the flow of the program goes back to the step S134.

If the outcome of the judgment formed at the step S135 indicates that the PCR packet detected at the step S134 is not a packet before the count value of the counter 221B, which has been reset with a timing of the count value of the counter 221A becoming equal to the reference value B, becomes equal to 3,240,000, on the other hand, the flow of the program goes on to a step S136.

In the example shown in FIG. 47, the next PCR packet Kn+2 is not a PCR packet detected before the count value of the counter 221B, which has been reset with a timing of the count value of the counter 221A becoming equal to the reference value B (the same value as the PCR value Vn), becomes equal to 3,240,000 (The next PCR packet Kn+2 is a PCR packet detected after the count value of the counter 221B becomes equal to 3,240,000 to be reset). Thus, the flow of the program goes on to the step S136 when the next PCR packet Kn+2 is detected.

At the step S136, the detection unit 221 computes a discontinuity value.

To put it concretely, the detection unit 221 acquires a count value Rn+2, which is contained in the counter 221A when the PCR packet Kn+2 is detected, and the PCR value Vn+2 of the PCR packet Kn+2.

Then, the detection unit 221 computes a discontinuity value by substituting the count value Rn+2 and the PCR value Vn+2 into an equation given below for a reference-clock PCR value and a post-multiplexing PCR value respectively:

Discontinuity value=[[{(Post-multiplexing *PCR* value−Reference value *B*)−(Reference-clock *PCR* value−Reference value *A*)}×3,240,000]÷(Reference-clock *PCR* value−Reference value *A*)]

The magnitude of a discontinuity value increases in proportion to the degree of discontinuity of the PCR value V. Then, the flow of the program goes on to a step S137 at which the detection unit 221 forms a judgment as to whether or not the absolute value of the discontinuity value computed at the step S136 is greater than a predetermined value Lp. If the outcome of the judgment indicates that the absolute value of the discontinuity value is greater than a predetermined value Lp (that is, the PCR value V is discontinuous), the flow of the program goes on to a step S138 at which the detection unit 221 informs the PCR renewal unit 215 that the PCR value V is discontinuous. Then, the flow of the program goes back to the step S134 to again carry out the processing of this step and the subsequent steps.

When informed by the detection unit 221 that the PCR value V is discontinuous, control is returned to the step S111 of the flowchart shown in FIG. 41. At the step S111, the PCR renewal unit 215 again carries out the processing of this step and the subsequent steps.

The series of processes described above can be carried out by hardware or software. If the processing is carried out by software, programs composing the software can be installed in a computer. The computer executes the programs to realize functions of the reception apparatus 22 described above.

FIG. 48 is a block diagram showing the configuration of an embodiment implementing a computer 501 functioning as the reception apparatus 22 described above. A CPU (Central Processing Unit) 511 is connected to an input/output interface 516 by a bus 515. The input/output interface 516 is connected to an input unit 518 including a keyboard and a mouse or the like. When the user enters a command to the input unit 518 by operating the keyboard or the mouse, the CPU 511 loads a program from a storage medium, for instance, a ROM (Read-Only Memory) 512, a hard disc 514 or a recording medium such as a magnetic disc 531, an optical disc 532 and a magneto-optical disc 533 mounted on a drive 520, or a semiconductor memory 534 into a RAM (Random-Access Memory) 513 and executes the program to carry out various kinds of processing described earlier. If necessary, the CPU 511 further outputs a result of processing to an output unit 517 such as an LCD (Liquid Crystal Display) by way of the input/output interface 516. It is to be noted that a program can also be stored in advance in the hard disk 514 and/or the ROM 512, which serve as a recording medium embedded in the computer. Thus, such a program is presented to the user along with the computer. As another alternative, a program can also be stored or recorded in a package medium such as the magnetic disc 531, the optical disc 532, the magneto-optical disc 533 and the semiconductor memory 534 to be presented to the user. As a further alternative, a program can be provided to the hard disc 514 from a satellite, a network and the like by way of a communication unit 519 employed in the computer.

In this specification, processing steps composing a program provided by a recording medium do not have to be implemented in an order indicated by the flowchart along the time axis. Instead, the steps may represent pieces of processing to be carried out in parallel or individually.

In addition, the word 'system' used in this specification mean the whole system including a plurality of apparatuses.

According to the present invention, the third time stamp corresponding to the first time stamp can be computed.

DESCRIPTION OF THE REFERENCE NUMERALS 22 reception apparatus, 71 ATM/MPEG conversion unit, 72 PLL circuit, 73 adaptive clock unit, 74 synchronization unit, 75 PCR-packet detection unit, 76 PCR renewal unit, 77 memory, 78 PCR-packet detection unit, 79 PCR renewal unit, 80 memory, 81 PCR comparison unit, 82 LPF, 83 VCXO, 84 switch, 101 PCR renewal unit, 102 memory, 103 PCR comparison unit, 201 multiplexer, 211 time-stamp, 212 FIFO, 213 switch, 214 PCR collection, 215 PCR renewal unit, 216 memory, 217 switch, 221 detection unit, 222 memory

What is claimed is:

1. A communication apparatus comprising:
   a receiving unit that receives a processed data packet including a first time stamp;
   a first computation unit that computes a second time stamp for the processed data packet received on a network, the second time stamp computed by determining an arrival time of the processed data packet based on a first count value of clock pulses synchronized to an asynchronous clock signal of the network, and comparing the first count value with synchronization information associated with the processed data packet;
   a second computation unit that computes a third time stamp, the third time stamp computed by removing a time shift between an internal reference clock and the second time stamp, wherein the internal reference clock is not synchronized to the asynchronous clock of the network; and
   a renewal unit that replaces the first time stamp in the processed data with the third time stamp;
   wherein the synchronization information is computed based on a phase difference between an asynchronous clock of a different network and the first time stamp associated with the processed data packet.

2. The communication apparatus of claim 1, wherein the second computation unit computes a next third time stamp by adding a correction value to a modified second time stamp, the modified second time stamp having the time shift between the internal reference clock and the second time stamp removed, and the correction value based on a result of comparing the third time stamp with the first time stamp.

3. The communication apparatus of claim 1, wherein the second computation unit computes a next third time stamp by adding a correction value to a modified second time stamp, the modified second time stamp having the time shift between the internal reference clock and the second time stamp removed, the correction value based on a result of comparing the second time stamp with the first time stamp.

4. The communication apparatus of claim 1, wherein the second computation unit computes a next third time stamp by adding a correction value to a modified second time stamp, the modified second time stamp having the time shift between the internal reference clock and the second time stamp removed, the correction value based on a result of comparing the third time stamp with the second time stamp.

5. The communication apparatus of claim 1 wherein:
   the first computation unit computes a next second time stamp by adding a correction value to a modified first time stamp, the modified first time stamp having a time shift between a clock associated with the first time stamp and the asynchronous clock of a different network removed, the correction value based on a result of comparing the third time stamp with the second time stamp; and
   the second computation unit computes a next third time stamp by adding a correction value to a modified second time stamp, the modified second time stamp having a time shift between the internal reference clock and the second time stamp removed, the correction value based on a result of comparing the first time stamp with the second time stamp.

6. A data communication method comprising:
   receiving a processed data packet including a first time stamp;
   computing a second time stamp by determining an arrival time of the processed data packet based on a first count value of clock pulses synchronized to an asynchronous clock signal of a network, and comparing the first count value with synchronization information associated with the processed data packet;
   computing a third time stamp by removing a time shift between an internal reference clock and the second time stamp, wherein the internal reference clock is not synchronized to the asynchronous clock of the network; and replacing the first time stamp in the processed data racket with the third time stamp;

wherein the synchronization information is computed based on a phase difference between an asynchronous clock of a different network and the first time stamp associated with the processed data packet.

7. A computer readable medium including computer program code for providing data communications, the computer readable medium comprising:

computer program code for receiving a processed data packet including a first time stamp;

computer program code for computing a second time stamp by determining an arrival time of the processed data packet based on a first count value of clock pulses synchronized to an asynchronous clock signal of a network, and comparing the first count value with synchronization information associated with the processed data packet;

computer program code for computing a third time stamp by removing a time shift between an internal reference clock and the second time stamp, wherein the internal reference clock is not synchronized to the asynchronous clock of the network; and computer program code for replacing the first time stamp in the processed data packet with the third time stamp;

wherein the synchronization information is computed based on a phase difference between an asynchronous clock of a different network and the first time stamp associated with the processed data packet.

8. A communication system comprising:

a transmission apparatus connected to a first network, the transmission apparatus receiving a data packet including a first time stamp, and the first network having a first asynchronous clock signal;

the transmission apparatus comprising:

a synchronization information processing unit, wherein the synchronization information processing unit determines an arrival time of the data packet based on a first count value of clock pulses synchronized to the first asynchronous clock signal, computes a phase difference between the first count value and the first time stamp, and attaches the phase difference information to the data packet as synchronization information;

a reception apparatus connected to a second network, the reception apparatus receiving the data packet from the transmission apparatus, and the second network having a second asynchronous clock signal;

the reception apparatus comprising:

a first program clock reference renewal unit, wherein the first program clock reference renewal unit determines an arrival time of the data packet based on a second count value of clock pulses synchronized to the second asynchronous clock signal, computes a second time stamp based on the second count value and the synchronization information;

an internal reference clock; and a second program clock reference renewal unit, wherein the second program clock reference renewal unit computes a third time stamp based on a difference between the internal reference clock and the second time stamp, and updates the data packet with the third time stamp, in place of the first time stamp.

9. The communication system of claim 8, wherein the internal reference clock is not synchronized to the second asynchronous clock signal.

10. The communication system of claim 8, further comprising a multiplexer, the multiplexer providing the data packet to the transmission apparatus, wherein the multiplexer computes a first time stamp and associates the first time stamp with the data packet, the first time stamp comprising a count value of a system clock associated with the multiplexer.

11. A communication reception apparatus, the communication reception apparatus connected to a network and receiving a data packet from a transmission apparatus, the data packet including a first time stamp and synchronization information, the network having an asynchronous clock signal, the reception apparatus comprising:

a first program clock reference renewal unit, wherein the first program clock reference renewal unit determines an arrival time of the data packet based on a count value of clock pulses synchronized to the asynchronous clock signal, computes a second time stamp based on the count value and the synchronization information in the data packet;

an internal reference clock; and a second program clock reference renewal unit, wherein the second program clock reference renewal unit computes a third time stamp based on a difference between the internal reference clock and the second time stamp, and updates the data packet with the third time stamp in place of the first time stamp;

wherein the synchronization information is computed based on a phase difference between an asynchronous clock of a different network and the first time stamp associated with the data packet.

12. The communications reception apparatus of claim 11, wherein the internal reference clock is not synchronized to the asynchronous clock signal.

13. A data communications method for data communications across a first network and a second network, the first network having a first asynchronous network clock signal, and the second network having a second asynchronous network clock signal, the method comprising:

associating a first time stamp with a data packet, the first time stamp comprising a count value of a system clock associated with a communications apparatus;

computing synchronization information, the synchronization information computed by:

determining an arrival time of the data packet at a transmission apparatus, the arrival time based on a first count value of clock pulses synchronized to the first asynchronous clock signal of the first network; and computing a phase difference between the first count value and the first time stamp;

associating the phase difference information with the data packet as synchronization information;

transmitting the data packet, the first time stamp, and the synchronization information via the first and second networks to a reception apparatus;

computing a second time stamp for the data packet received by the reception apparatus, the second time stamp computed by:

determining an arrival time of the data packet based on a second count value of clock pulses synchronized to the second asynchronous clock signal; and computing the second time stamp based on the second count value and the synchronization information;

computing a third time stamp based on a difference between an internal reference clock and the second time stamp; and replacing the first time stamp in the data packet with the third time stamp.

14. The method of claim 13, wherein the internal reference clock is not synchronized with the second asynchronous network clock signal.

* * * * *